United States Patent
Bristol

(10) Patent No.: US 6,535,122 B1
(45) Date of Patent: Mar. 18, 2003

(54) METHOD AND APPARATUS FOR EXTENDING PROCESSING MASK/FILTERING, AND DISPLAYING ALARM INFORMATION FOR A HIERARCHICALLY CATEGORIZING ALARM MONITORING SYSTEM

(75) Inventor: Edgar H. Bristol, Foxboro, MA (US)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 09/558,747

(22) Filed: Apr. 21, 2000

Related U.S. Application Data

(63) Continuation-in-part of application No. 09/303,519, filed on Apr. 30, 1999.
(60) Provisional application No. 60/123,215, filed on Mar. 8, 1999, provisional application No. 60/119,523, filed on Feb. 8, 1999, and provisional application No. 60/083,903, filed on May 1, 1998.

(51) Int. Cl.$^7$ .................................................. G08B 29/00
(52) U.S. Cl. ........................................................ 340/506
(58) Field of Search ............................... 340/506, 507, 340/517, 521, 524, 825.36, 825.49

(56) References Cited

U.S. PATENT DOCUMENTS

| | | | |
|---|---|---|---|
| 4,908,746 A | 3/1990 | Vaughn | 364/147 |
| 5,226,118 A | 7/1993 | Baker et al. | 395/161 |
| 5,400,246 A * | 3/1995 | Wilson et al. | 340/825.06 X |
| 5,557,549 A | 9/1996 | Chang | 364/551 |
| 5,617,311 A | 4/1997 | Easter et al. | 364/185 |

FOREIGN PATENT DOCUMENTS

| | | |
|---|---|---|
| EP | 0 592 921 A1 | 10/1993 |
| EP | 0 694 825 A2 | 1/1996 |
| EP | 0 810 557 A2 | 12/1997 |
| GB | 2 275 813 A | 9/1994 |
| WO | WO 97/49099 | 12/1997 |

OTHER PUBLICATIONS

Bristol, E., et al., "Alarm Analysis can Diagnose System Faults", *Control Engineering*, Feb. 1975.

Bristol, E., "Alarm Sequence Analysis", Report No. 12672-T155, The Foxboro Company, Dec. 7, 1971.

* cited by examiner

*Primary Examiner*—Daryl Pope
(74) *Attorney, Agent, or Firm*—Hamilton, Brook, Smith & Reynolds, P.C.

(57) ABSTRACT

Second order benefits are added to the previous alarm monitoring system, which groups alarms into categorizations, categories, and patterns of alarm variables. Some results of the second order benefits are improvements in overall look, feel, and control. Second order benefits/improvements include improving descriptor summary processing, pattern recognition, mask/filtering, and displaying information.

22 Claims, 16 Drawing Sheets

Access Map: Categories (Normal), Categorizations (Bold), Patterns (in Italics)

STYRENE PLANT GRAPHIC showing Summary, OWS and Priority Summary

2074

2050 — OriginalCategory
2053 — OneWordSummary (if distinct)
    2060a — 1stDividingCategory
        1stDivision2ndGeneration1stDividing OWS — 2064a
        ...
        1stDivision2ndGeneration2ndDivisionOWS — 2062a
        ...
    2ndDivisionOWS — 2060b
        2ndDivision2ndGeneration1stDividing OWS
        ...
        2ndDivision2ndGeneration2ndDivisionOWS
        ...
...

FIG. 8

FIG. 9
History Log (advanced to the 34th sample time)

FIG. 15

METHOD AND APPARATUS FOR EXTENDING PROCESSING MASK/FILTERING, AND DISPLAYING ALARM INFORMATION FOR A HIERARCHICALLY CATEGORIZING ALARM MONITORING SYSTEM

RELATED APPLICATION

This is a Continuation-in-Part of application Ser. No. 09/303,519, filed Apr. 30, 1999 entitled "Alarm Analysis Tools Method and Apparatus", which claimed the benefit of Provisional Application No. 60/083,903 filed May 1, 1998 entitled "Alarm Analysis Tools"; Provisional Application No. 60/119,523 filed Feb. 8, 1999 entitled "Category Regular Expression Visual Configuration Method and Apparatus"; and Provisional Application No. 60/123,215 filed Mar. 8, 1999 entitled "Functional Mask/Filter Elements and Apparatus". The entire teachings of all are incorporated herein by reference in their entirety.

BACKGROUND OF THE INVENTION

Process control alarm systems are used in the area of factory automation. Specifically, process automation uses many process control alarms to inform operators that a process is within or has exceeded process control tolerance limits. A typical application in which a process control alarm system is employed is a styrene manufacturing plant. Within a styrene manufacturing plant, various manufacturing processes require machines and equipment, such as a feed tankage system, furnace, heat recovery system, one or more reactors, and a separator. The number of process control alarms constantly monitoring these machines in a styrene manufacturing plant ranges in the hundreds, whereas in oil refineries, then number ranges in the tens of thousands. Each process control alarm generally has at least one associated process control alarm variable.

In the past, alarm displays have been large boards with lights and labels, where an illuminated light or LED indicates which process control alarm has sensed a problem in a machine, or which machine in the factory is experiencing a problem. Today, a software interface to aid operators in understanding what is happening with one or many machines is used rather than the alarm board. Increasingly, a GUI (Graphical User Interface) is used as the human-to-machine interface because of its inherent ease of use and intuitive qualities. Through a GUI interface, process control alarm monitor variables are often capable of being set and monitored. These process control alarm monitor variables are linked to one or more feedback systems used in a process control system to make pseudo real-time analysis possible.

A typical alarm system supports a set of standard (absolute and deviation) alarm conditions associated with several control block types. These control block types cause a corresponding indication in associated loop and process displays whenever an alarm condition occurs. In some alarm monitor systems, log displays augment the process displays and list a history of all alarms that have occurred in some interval of time, subject to a selection filter.

Alarms are a main automation system vehicle for dealing with operations too abnormal for automated accommodations. A large fraction of the abnormalities are effectively unfamiliar to an operations and applications group. Some abnormalities are very mild, but others are catastrophic. There are applications with thousands of potential alarms defined having hundreds of alarms active at any point in time, sometimes within a single causal shower.

A typical alarm system that provides alarm priority handling capabilities is inherently inadequate to support an operator in recognizing and coping with resulting abnormal or crisis situations. This is true under the best human factors support and applications design. An interest in operating with fewer operators places that much more of a load on the reduced number of operators, exacerbating the problem.

SUMMARY OF THE INVENTION

The prior art alarm monitoring systems fall short of providing an operator with a powerful means of accurately and insightfully diagnosing problems in a machine/process during a so-called alarm shower or, even, a static alarm situation. In patent application Ser. No. 09/303,519 filed Apr. 30, 1999 entitled "Alarm Analysis Tools Method and Apparatus", the teachings of which are incorporated by reference in their entirety, an alarm monitoring system (referred to hereinafter as the previous system) (i) provides a powerful means for the operator to diagnose alarm situations, including alarm showers, and (ii) begins to optimize alarm diagnostic information by allowing an operator/system designer to group the alarms in an organized and meaningful manner. Once a hierarchically categorized and pattern-defined alarm monitoring system structure has been defined and is producing first order benefits in the areas of processing, filtering, and display, second order benefits may be leveraged on the defined structure of the monitoring system. Presently, the previous system stops short of providing second order benefits in selected areas of processing, filtering, and display. These second order benefits are described in Provisional Patent Application No. 60/123,215 filed Mar. 8, 1999 entitled "Functional Mask/Filter Elements and Apparatus," the entire teachings of which are incorporated herein by reference in their entirety.

In general, the present invention adds second order benefits to the previous alarm monitoring system that groups alarms into categorizations, categories, and patterns of alarm variables. Processing, mask/filter interfacing, control, and display capabilities are expanded. Some results of the second order benefits are improvements in overall look, feel, and control.

Second order benefits/improvements include improving descriptor summary processing, pattern recognition, mask/filtering, and displaying information. One word summary processing is improved for handling independent, related sets of events. "One word" summaries do not literally mean a single word summary, e.g., fuel tank; the term descriptor summary may be used to avoid confusion. Pattern recognition is improved by determining previously unidentified patterns from an alarm history log, then using the identified, previously unknown patterns in distinguishing these patterns from all of the other alarms and patterns occurring at the same time. Mask/filtering is improved by expanding masking based on functional considerations. Additionally, mask/filtering is improved by expanding the mask/filter modes for use with large numbers of nested categories. Finally, display capability is improved through additional selectors to calculated category displays.

The present invention includes a method and apparatus for recursively generating a one word summary for related independent events applied to an alarm monitoring system having categories and subcategories of alarms. The apparatus accesses alarm data that provides the states of the alarms. From the intersection between the states of the alarms and the total active alarms of an indicator category, a one word summary is computed to be the name of whichever one of a complete set of pre-configured categories of alarms has an intersection with the selected category which includes all of the same active alarms and the fewest other active or inactive alarmed variables. Then, based on alarm status for a subset of categories, the apparatus recursively determines one word summary categories for each one word summary category and subcategory. The result is one or more one word summaries for related, independent, alarm events.

The present invention also includes a method and apparatus for determining novel forms of patterns for future detection of the determined novel alarm patterns. A processor routine scans a historical database of alarm events for significant alarm events. By applying an auto-correlation technique across multiple significant alarm events, the processor routine determines novel forms of patterns of alarm events. Preferably, the processor routine employs time windows immediately after or optionally before the significant alarm events. The reason for using auto-correlation is that it restricts noise effects due to overlapping, unknown patterns. After the processor routine determines previously unrecognized alarm patterns, the processor routine applies the determined patterns of alarms to an alarm variable stream captured by the alarm monitoring system. In turn, the apparatus detects the determined novel forms of alarm patterns in the stream of alarm events.

The present invention also includes a method and apparatus for affecting reported information provided by an alarm monitoring system having categories and subcategories of alarms. Each category and subcategory includes related alarm variables having respective alarm and category status information. An alarm monitoring system displays in various screen views the plurality of alarm categories and subcategories and the alarm and category status information. Selectable functional mask/filter indicators are provided, where the functional mask/filter indicators represent possible functional states of the alarms. The alarm variables are mask/filtered across a subset of the alarm categories as a function of the state of the selectable functional mask/filter indicators. This affects the reported category alarm status information provided in the screen view.

The present invention also includes a method and apparatus for controlling and displaying mask/filter selections for an alarm monitoring system having hierarchically defined categories of alarms. A provided screen view displays a subset of categories expressed as category indications in a graphical user interface manner. Each category is a member of a categorization and includes subcategories and alarm variables, which represent corresponding alarm status information. The screen view includes mask/filter selectors, which are coupled to the category indications and a mask/filter. The mask/filter is coupled to the categorizations (and included categories, subcategories, and alarm variables), and the mask/filter selectors include an all-select selector and a so-called "select" selector. The all-select selector enables an operator to select alarms in a specified category without regard to included, respective, subcategory, alarm selections. The select selector enables an operator to select alarms in a specified category, except for alarms not selected in included, respective, subcategory, alarm selections. The state of the mask/filter is changed in response to an operator's selecting alarms at any hierarchical level (i.e., the processor routine modifies the underlying mask/filter bit string(s). Also, the processor routine visually modifies (as a function of the mask/filter) a subset of categorization, category, and alarm variable indications to provide mask/filter state information in the screen view, thereby displaying mask/filter selections.

The present invention also includes a method and apparatus for providing alarm information in an alarm analysis system having summary alarm status calculation capability. A first screen view displays at least one category of alarm information. For categories having a determinable one word summary for an overall alarm status within each category, a respective associated, dynamically computed, summary indicator describing the alarm status is presented to the operator. In response to an operator selection of a summary indicator, a second screen view is displayed having detailed information relating to the summary indicator. The second screen view thereby provides dynamic, detailed, alarm status information.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 8 is a text representation optionally used by the alarm monitoring system of FIG. 2 to schematically display recursively determined one word summary category results represented in FIG. 7;

FIG. 9 is a screen view of a history log of alarms, received and captured by the alarm monitoring system of FIG. 1, on which an off-line discrete auto-correlation pattern analysis is performed to determine previously unrecognized patterns of alarms;

FIG. 15 is a bit array diagram indicating an alarm bit string, typical mask/filter, and resultant set of filtered alarms, where the alarm bit string represents alarm state data captured by the alarm monitoring system of FIG. 1;

DETAILED DESCRIPTION OF THE PREFERRED EMBODIMENT

Figure 1:
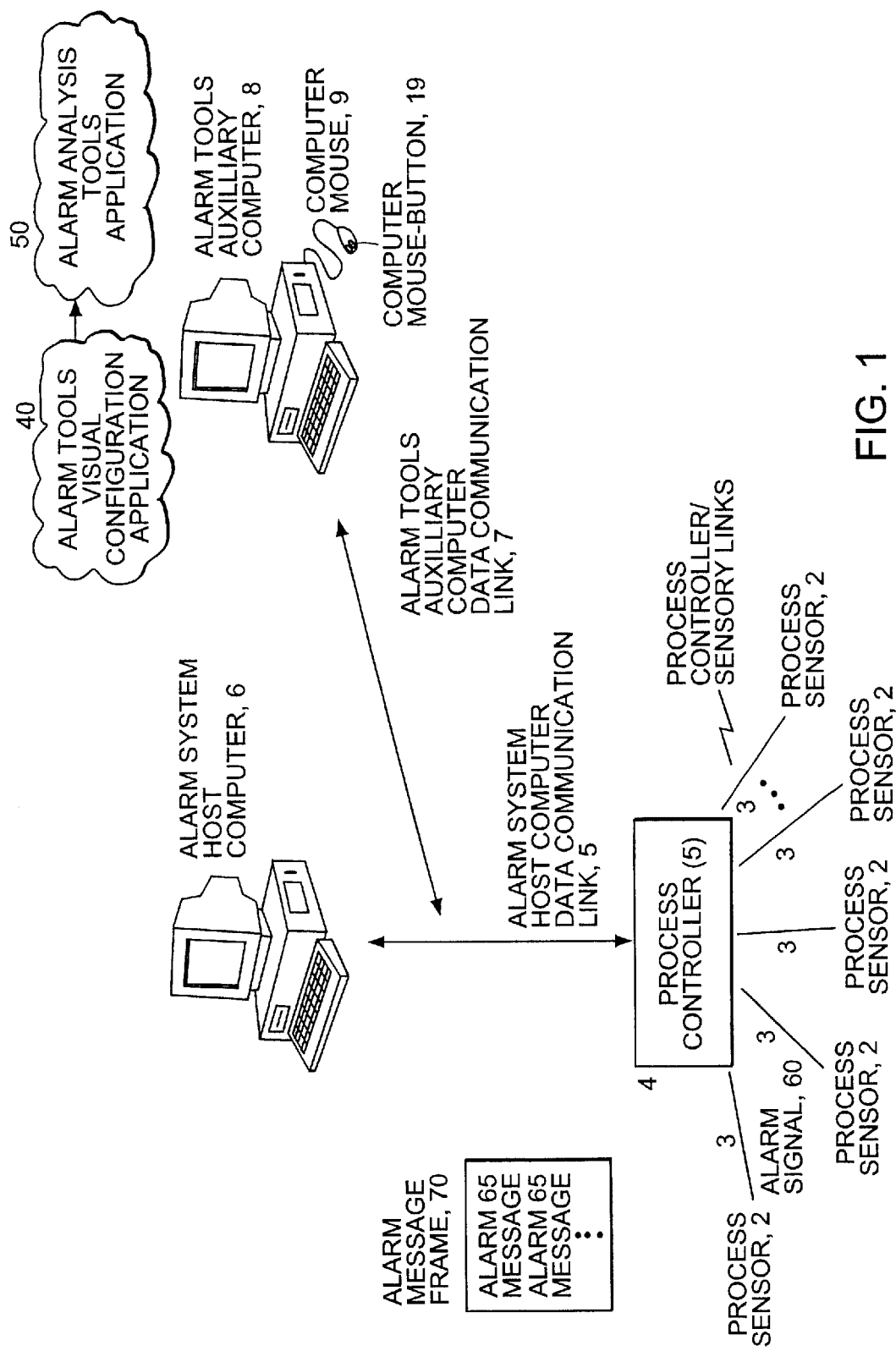
FIG. 1 is an illustration of a computer network environment in which an alarm monitoring system of the present invention is deployed.

For purpose of illuminating the present invention enhancements over the previous system (see application Ser. No. 09/303,519 incorporated herein by reference), a short overview is provided. The previous alarm monitoring system includes embodiments either integrated into or attached to alarm systems that monitor and/or control machine operations. The previous alarm monitoring system embodiments include processing, display, and diagnostic capabilities for operators to reduce diagnosis time of system faults (i.e., alarm showers). The processing capabilities include functions and routines for receiving alarm status data and organizing/displaying the data into screen views (display areas), such as graphical user interface windows. From the displayed information, an operator is aided in determining a cause of an alarm situation.

More specifically, the previous alarm monitoring system is able to organize and display the alarm status data by providing alarm grouping structures in which alarm data is organized during an alarm monitoring system configuration period. The alarm grouping structures include hierarchical structures and pattern structures (see application Ser. No. 09/303,519, incorporated herein by reference). The hierarchical structures comprise categorizations having included categories and pattern categories. Categories include subcategories, patterns, and alarm variables. Patterns specify alarm sequences; alarm sequences are composed of so-called "cause", "result", and "effect" alarms.

The hierarchical and pattern structures provide manageability of large numbers of alarms (e.g., 50,000). First order processing, filtering structures, and display capabilities provide tremendous advantages over older types of alarm systems not organized into hierarchical categorizations and pattern structures. Examples of first order processing include descriptor summaries and pattern determinations. (It should be noted that "descriptor summaries" are hereinafter referred to as "one word summaries" or "one word summary categories", where the term "one word" is a misnomer since one word summaries are not limited to a single word, e.g., fuel tank, nor is a descriptor summary limited to a single word. Further, the terms "descriptor summary" and "one word summary" may be used interchangeably, where descriptor summary is used with the intent that a reader does not understand the summary to be limited to a single word.) First order filtering structures enable received alarms to be quickly processed using standard Boolean mathematics. First order display capabilities provide operators with alarm information in an organized and meaningful manner.

Hierarchically structured alarm systems are well suited for a form of processing that provides directed diagnostic information. This form of processing is referred to as one word summary (OWS) processing. A one word summary is the name of whichever one of a complete set of pre-configured categories of alarms has an intersection with the selected category that includes all of the same active alarms and the fewest other (active or inactive) alarmed variables. This generates a compact description of the alarm occurrences. If only one collection of related alarms is active (and a corresponding category has been defined), this description is optimal for quickly and efficiently communicating the current alarm situation to an operator.

Pattern definitions are used to predict alarms based on other alarm events and/or sequences. Patterns of alarms are defined by an operator or engineer, and, during operation, the alarm monitoring systems scan alarm streams in the alarm system data communication links for the defined patterns of alarms. It is important for personnel to anticipate and define alarm pattern events to the alarm monitoring system in order to have the alarm monitoring system indicate such patterns; undefined alarm patterns are undetected by the alarm monitoring system.

A mask/filter is a structure used by the alarm system described for performing filtering and masking operations on alarm variables, which contain alarm status state information. The mask/filter allows specified alarm variables to undergo normal processing (adding to category metrics in certain cases) and is also used to display predefined alarm variable information to the operator. In one example (styrene processing plant), the previous system mask/filter defines alarm variables as belonging to categories divided into process divisions, streams, and situations, and includes masking based on functional considerations, such as: acknowledgment or unacknowledgment, recent or old, in or out of service. The processing of alarm variables is a function of independent settings within each of the categories, performed independently of the functional categories.

To aid an operator in understanding the alarm information being displayed, the operator must be cognizant of the mask/filter being applied to the alarm variables. So, when an individual hierarchical layer is presented to the operator, the corresponding mask/filter is represented on that layer. In other words, no matter which layer the operator is viewing within any categorization within the system, the mask/filter provided for the user stays within the respective categorization and is relative to the category being viewed. To view the mask/filter settings for hierarchical layers above or below the layer being displayed in a screen view (graphical user interface window), the operator selects the screen view with the respective hierarchical category information and the mask/filter settings are presented by the alarm monitoring system.

In the previous alarm monitoring system, any of the hierarchical displays allows the direct selection of lower level displays supporting this goal. For example, a pattern overview display lists the patterns in order of best match to immediate alarm history and includes selectable (graphical) buttons for showing a more detailed display of the alarms for that pattern. For categories, however, an operator must navigate to hierarchically higher (superior) and lower (subordinate) categories via typical graphical user interface means.

The discussion now turns to improvements of the previous system. The improvements include second order benefits in the areas of one word summary processing, pattern recognition, mask/filtering, and displaying of alarm information. Each area of improvement is discussed in turn in conjunction with corresponding figures. To provide context for the improvements to the previous system, a select number of figures and accompanying discussion are included that describe the previous system to which the subjects of the second order benefits are applied.

FIG. 1 is an illustration of a computer network environment in which the present invention is deployed. Briefly, an alarm system host computer 6 communicates to a set of process controllers 4 via an alarm system host computer data communication link 5. An alarm analysis tools auxiliary computer 8 taps into the alarm system host computer data communication link 5 via an alarm analysis tools auxiliary computer data communication link 7. In the preferred embodiment of the present invention, the alarm analysis tools auxiliary computer 8 has I/O (input/output) accessories, such as a computer mouse 9 comprising a computer mouse selector or button 19. Other cursor control devices and input means (e.g. keyboards, speech input devices, touch screens, and so on) are suitable.

An alarm message frame 70, issued by the process controllers 4 to the alarm system host computer 6 via the alarm system host computer data communication link 5, is received by the alarm system host computer 6. The alarm analysis tools auxiliary computer 8 simultaneously receives the alarm message frame 70 via the alarm analysis tools auxiliary computer data communication link 7. The received alarm message frame 70 is processed by an alarm analysis tools application 50, which resides on the alarm analysis tools auxiliary computer 8. The alarm analysis tools application 50 is pre-configured and displays a set of alarm messages 65 in accordance with received information from the present invention (i.e., alarm analysis tools visual configuration application 40).

A plurality of alarm message frames 70 is referred to as a stream of alarm message frames (or alarm data). The alarm message frames 70 are generated by the process controllers 4 in response to receiving alarm signals 60 from process sensors 2 via process controller/sensor links 3. Alarm signals 60 may be issued from a process sensor 2 due to an out-of-range detection, failure detection, or malfunction of a process sensor 2.

In the preferred embodiment, the possible alarm messages 65 that are transferred in the alarm message frame 70, in response to a process controller 4 having received an alarm signal 60, are known by the alarm analysis tools visual configuration application 40. In some instances, the alarm messages 65 are determined, organized, and categorized prior to an alarm system installation; other times, the alarm messages 65 are created in an evolutionary fashion, along with their associated process control systems (i.e. process controllers 4, links 3 and processor sensors 2).

Figure 2:
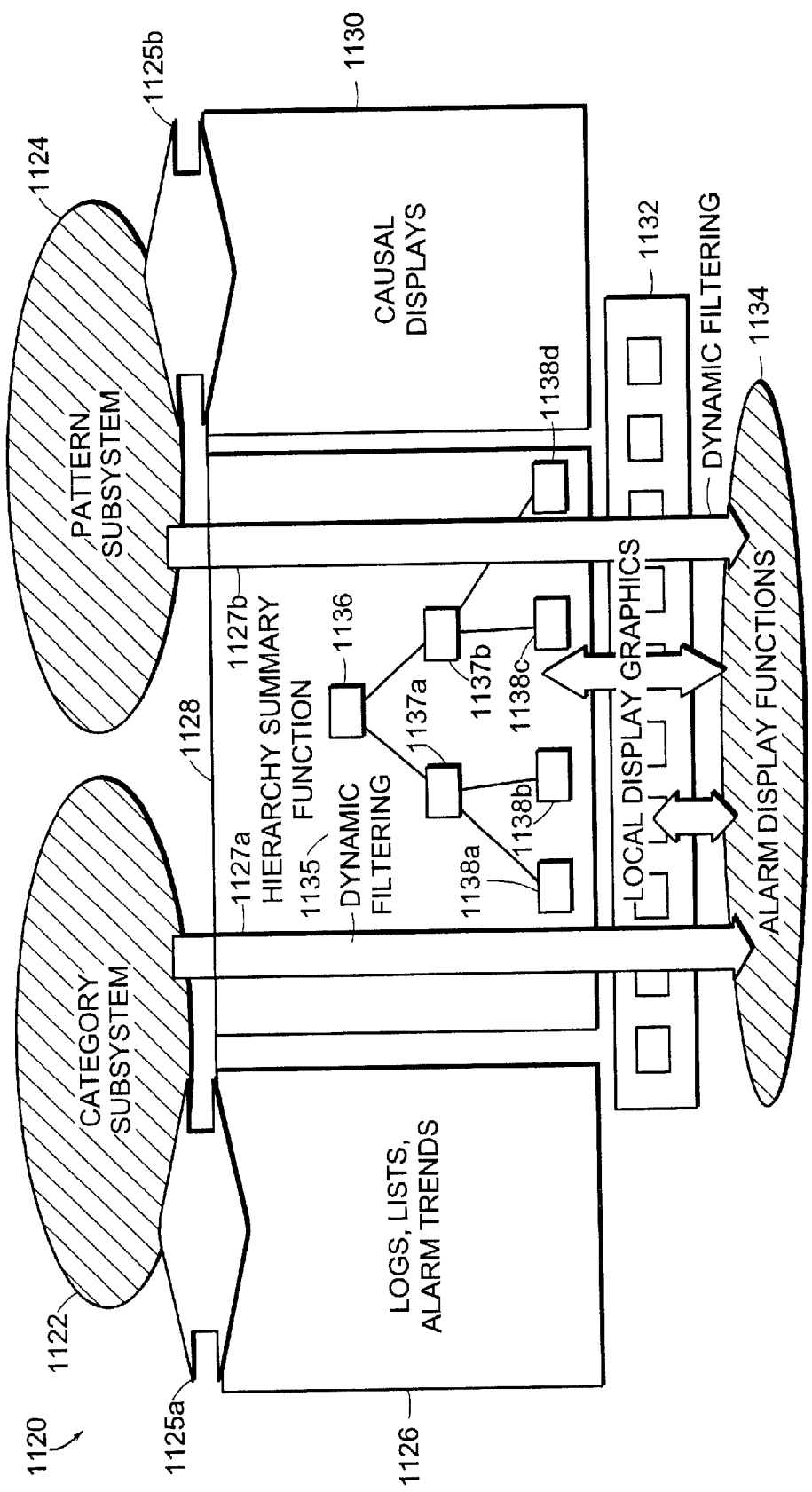
FIG. 2 is a schematic diagram an alarm monitoring system of FIG. 1.

FIG. 2 is a structural 1120 of the alarm tools application (monitoring system) 50 (FIG. 1) in which the present invention is deployed. Included in this structural embodiment 1120 are aspects of analysis and display processes used by the present invention to display alarm information to an operator.

A category subsystem 1122 and/or a pattern subsystem 1124 provide analysis support for the structural embodiment 1120 shown. Within the subsystems 1122, 1124 are means for mapping alarm messages 65 (FIG. 1) into alarm indications and updating a plurality of variables used to update category and categorizations metrics.

Several paths link the category and pattern subsystems 1122, 1124 with display routines/functions 1134. Links 1125a and 1125b transfer categories and patterns, which are a special type of category, directly to display generators 1126, 1128, 1130. One display generator 1126 supports displaying of logs, lists, and alarm trends associated with the category subsystem 1122, while another display generator 1130 supports causal displays associated with the patterns subsystem 1124. Display generator 1128 is further described below.

Dynamic filtering links 1127a, 1127b represent paths that mask and filter (mask/filter) information between the category and pattern subsystems 1122, 1124 and the alarm display functions 1134. The alarm display functions 1134 are supported by display graphics functions 1132, which provide low-level graphical driver functionality specific for the computer on which the present invention is operated.

Inside the display generator 1128 is a hierarchical diagram 1135, representing hierarchically defined categories and display capabilities of those categories. The top level category 1136 is an "indicator" category (referred to as an indicator category since it is a top level category represented in a display window). An operator traverses the category hierarchy 1135 to view subcategories 1137a, 1137b, and further traverses the category hierarchy 1135 to view even lower subcategories 1138a, 1138b, 1138c, 1138d. Information from subcategories, such as subcategory 1138a, propagates through the hierarchy 1135 up to the top level category 1136, thereby giving an operator an ability to view subcategory information.

Figure 3:
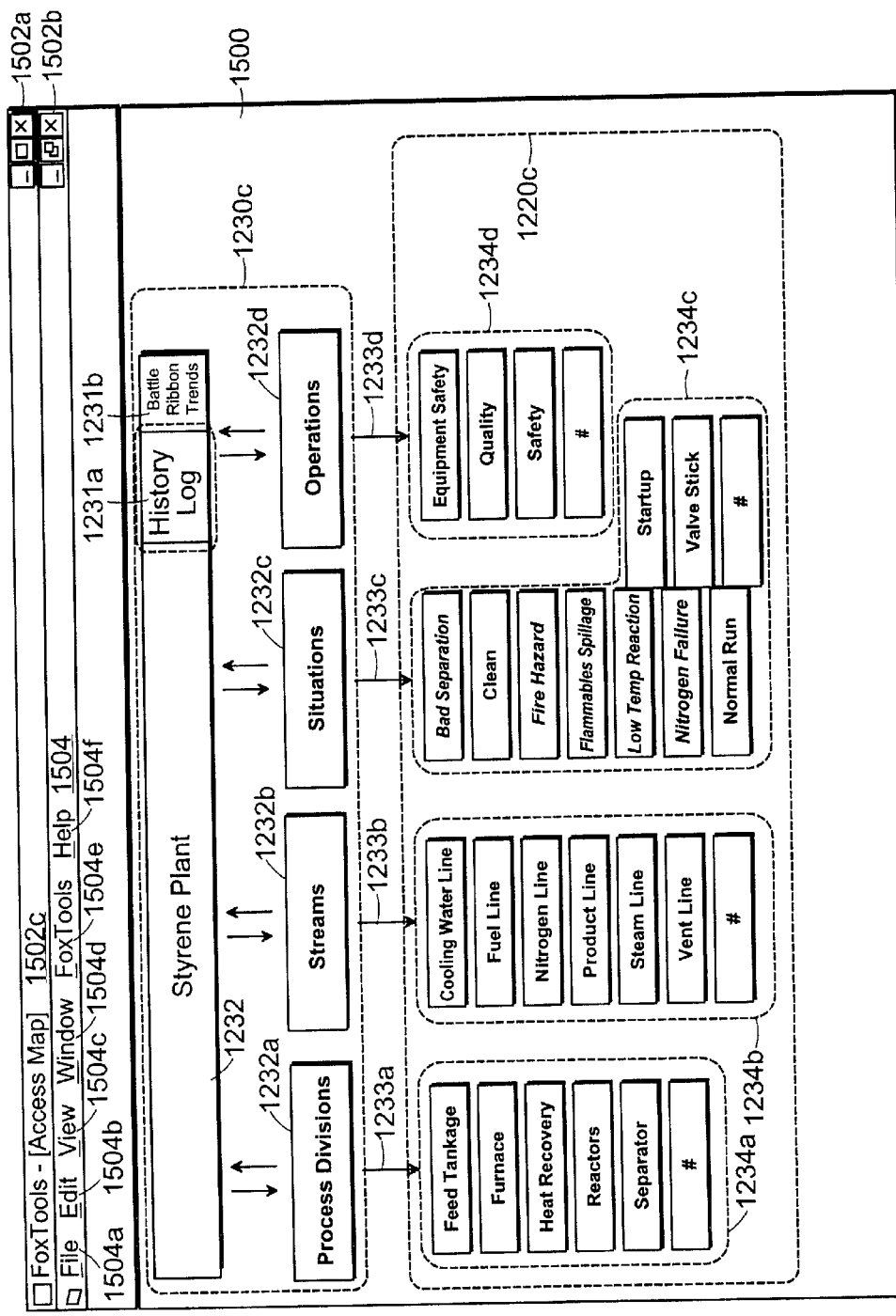
FIG. 3 is a screen view of an example application of the alarm monitoring system of FIG. 1.

FIG. 3 represents the preferred embodiment of a top level GUI (graphical user interface) window 1500 of the present invention. Standard GUI window 1500 features shown include window control buttons 1502a, 1502b, a window title bar 1502c, and a window tool bar menu 1504. In the GUI window 1500 shown, a plurality of control button icons in portions 1230c, 1220c are displayed. Using an input/output device, such as the computer mouse 9 (FIG. 1), an operator selects various areas of the button icons in 1230c, 1220c to initiate display of a desired subwindow. A detailed discussion of the use of and interface with the standard GUI window 1500 features and control buttons is provided in application Ser. No. 09/303,519 in reference to FIG. 24 and is incorporated herein by reference.

In a categorization portion 1230c of the window 1500 shown, there is a styrene plant (i.e., global categorization) button 1232, process divisions categorization button 1232a, streams categorization button 1232b, situations categorization button 1232c, and operations categorization button 1232d. Also shown in the GUI window 1500 is a history log button 1231a and battle ribbon trends button 1231b. Selection of any of the aforementioned buttons, 1232, 1233a . . . d, 1231a, 1231b opens an associated subwindow corresponding to a title in the button 1232, 1233, 1231 selected.

An alarm category section 1220c includes a plurality of categories. Each column of categories is defined to be included within a categorization listed in the categorization button 1232a, 1232b, 1232c, 1232d located directly above the category button column, and pointed to by a graphical arrow 1233a . . . d, respectively. In the embodiment shown, selecting a category button from the category button columns 1234a . . . d results in an associated subwindow being displayed having information specific to the category listed in the selected button.

Figure 4:
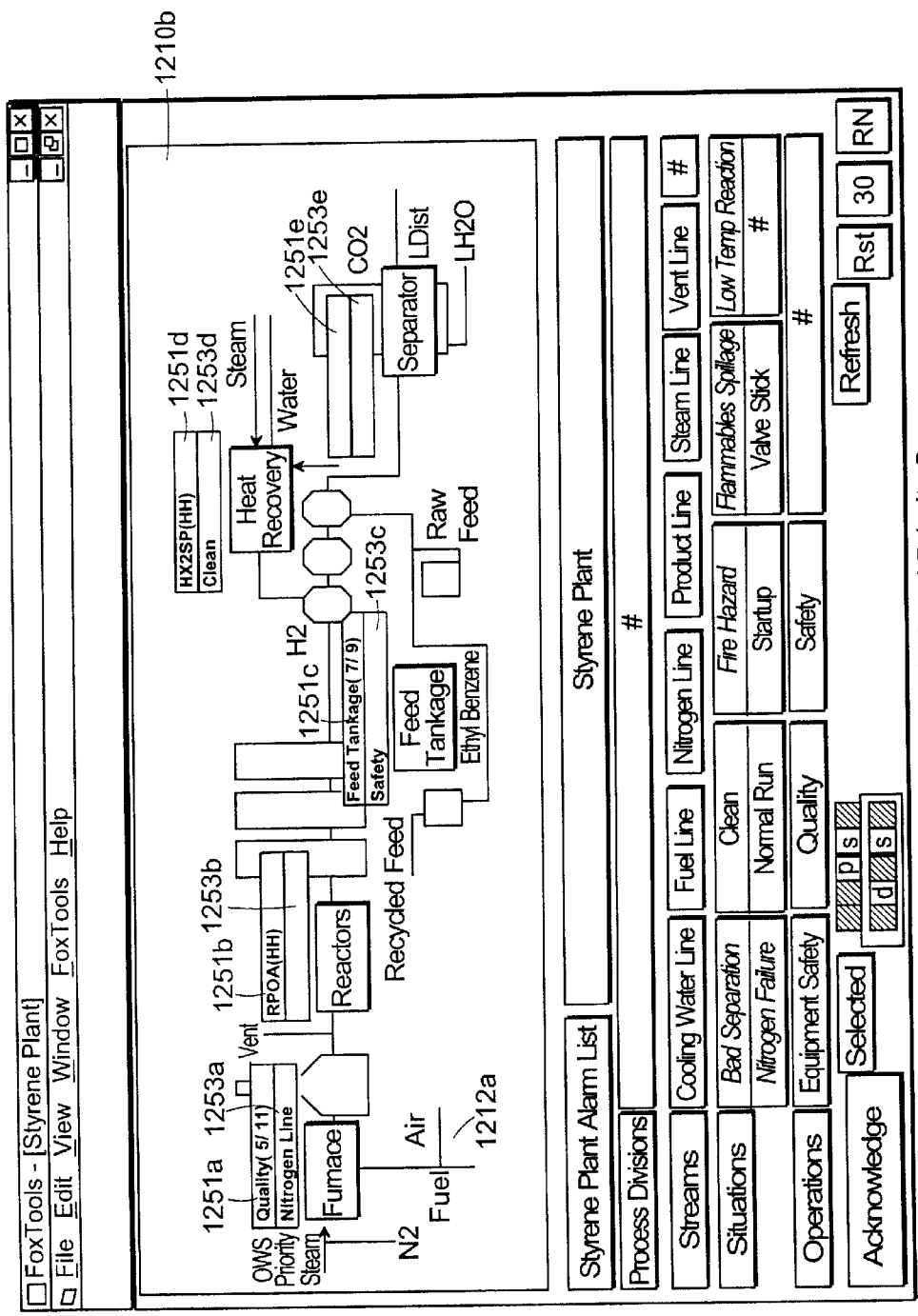
FIG. 4 is another screen view based on the plant graphic of the example application of FIG. 3.

FIG. 4 is a screen view having a styrene plant graphic associated with the styrene plant button 1232 of FIG. 3. The styrene plant graphic is displayed in a main display area 1210b. Respective one word summary 1251 and priority summary 1253 data are indicated above a respective category (e.g., furnace, reactors, etc). The various formats provide various levels of meaningful information to an operator, particularly because an operator has freedom to choose a display based on an abnormal situation and a desired level of analysis.

Figure 5:
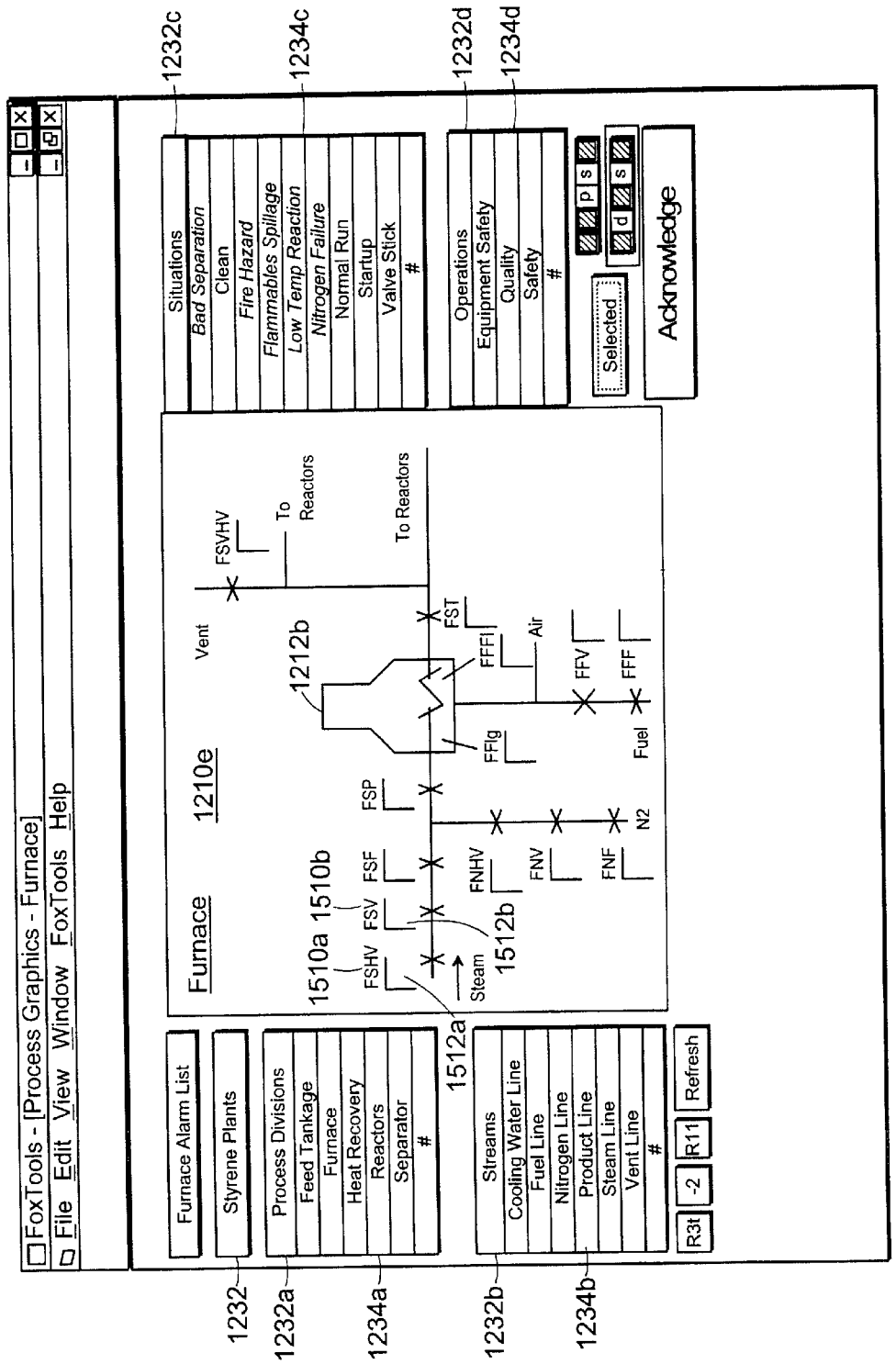
FIG. 5 is a screen view having a schematic diagram based on the plant graphic of a subsystem of the example application of FIG. 3.

FIG. 5 is a process graphics window of a furnace category. Included in the displayed window are operator interface buttons, in the form of independent categorization buttons 1232a . . . d and category buttons 1234a . . . d. The display further includes a main display area 1210e having a process graphic 1212b for the subject furnace category.

The furnace process graphic 1212b in the main display area 1210e includes an alarm indication listing in the graphic; two alarm indications are FSHV 1510a and FSV 1510b, where each example alarm indication has an associated alarm information box 1512a, 1512b, respectively. Every alarm indication within the furnace category is displayed in the process graphic display 1210e. To that end, the main display area 1210e provides an operator with a "road map" of the process steps being monitored in the subject furnace category.

Figure 6:
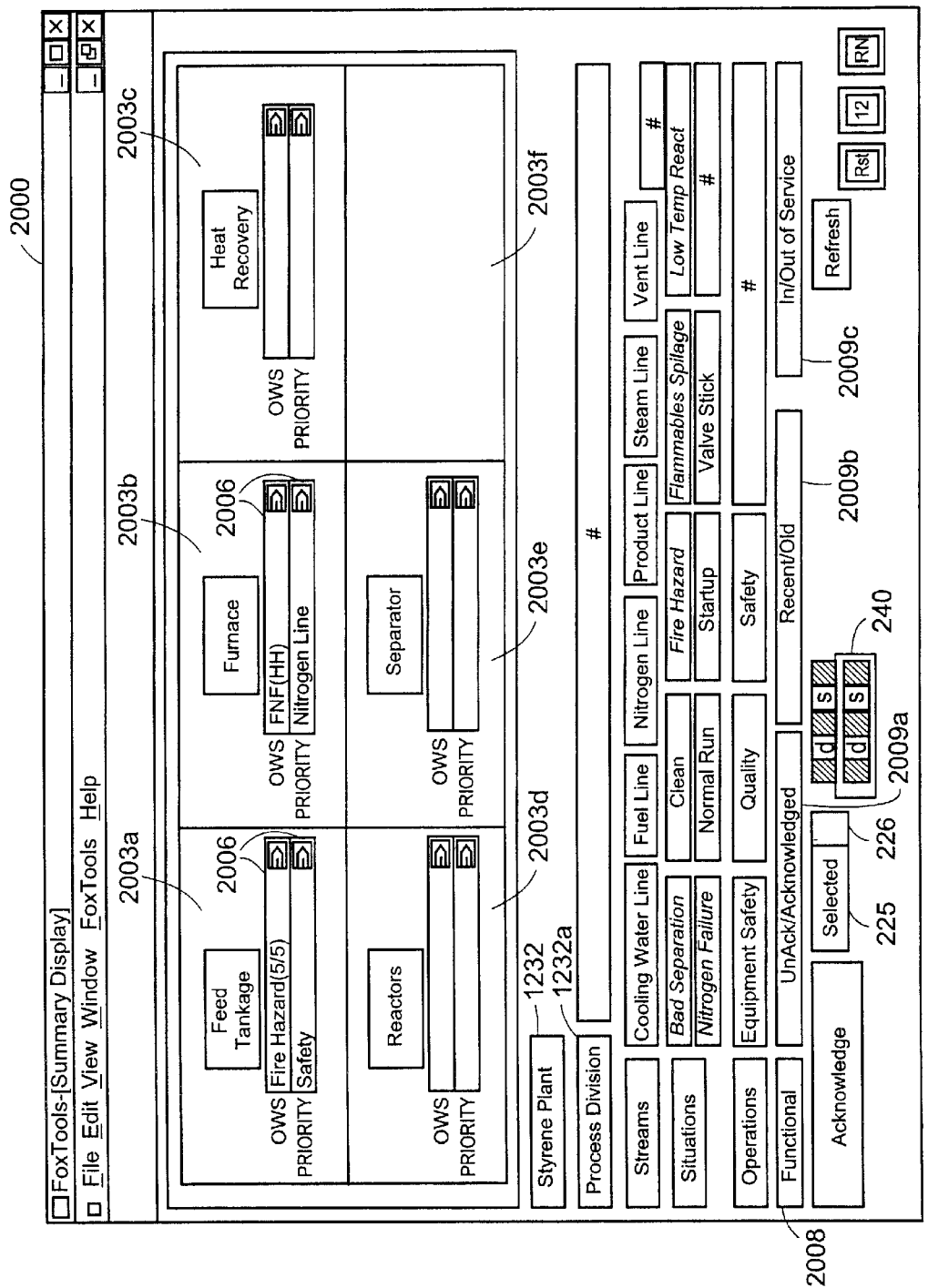
FIG. 6 is a screen view of a summary display of the example application of FIG. 3.

FIG. 6 is a screen view 2000 having summary information provided by the alarm monitoring system 50 (FIG. 1). In particular, screen view 2000 displays two categorizations: a styrene plant categorization 1232 and a functional categorization 2008. Each of these categorizations 1232, 2008 is formed of respective categories 1232a, 2009a–c of alarm information. For example, a "process divisions" category 1232a is within the styrene plant categorization 1232 and includes alarm information regarding feed, tankage, furnaces, heat recovery, reactors and separators. Members of the "process divisions" category 1232a (feed tankage, furnace, heat recovery, reactors, separators) within the styrene plant categorization 1232 are displayed in summary sections 2003a, . . . , 2003f (collectively 2003), respectively.

Likewise, the functional categorization 2008 includes functional categories displayed as functional category indicators 2009a, . . . 2009c, respectively. Further, in screen view 2000, mask/filter toggle controls are shown as indicators 225, 226, 240.

The screen view 2000 includes results from processing, mask/filtering and displaying alarm frames 70 (FIG. 1). The present invention improves processing and presentation of the alarm frame 70 data 65. For example, the fire hazard one word summary in the feed tankage category in summary area 2003a includes improved information using a recursive one word summary process (discussed in reference to FIG. 7). The recursive one word summary process returns one word summaries for several independent, related sets of alarm events, rather than a single indication (e.g., fire hazard, safety, etc).

Figure 7:
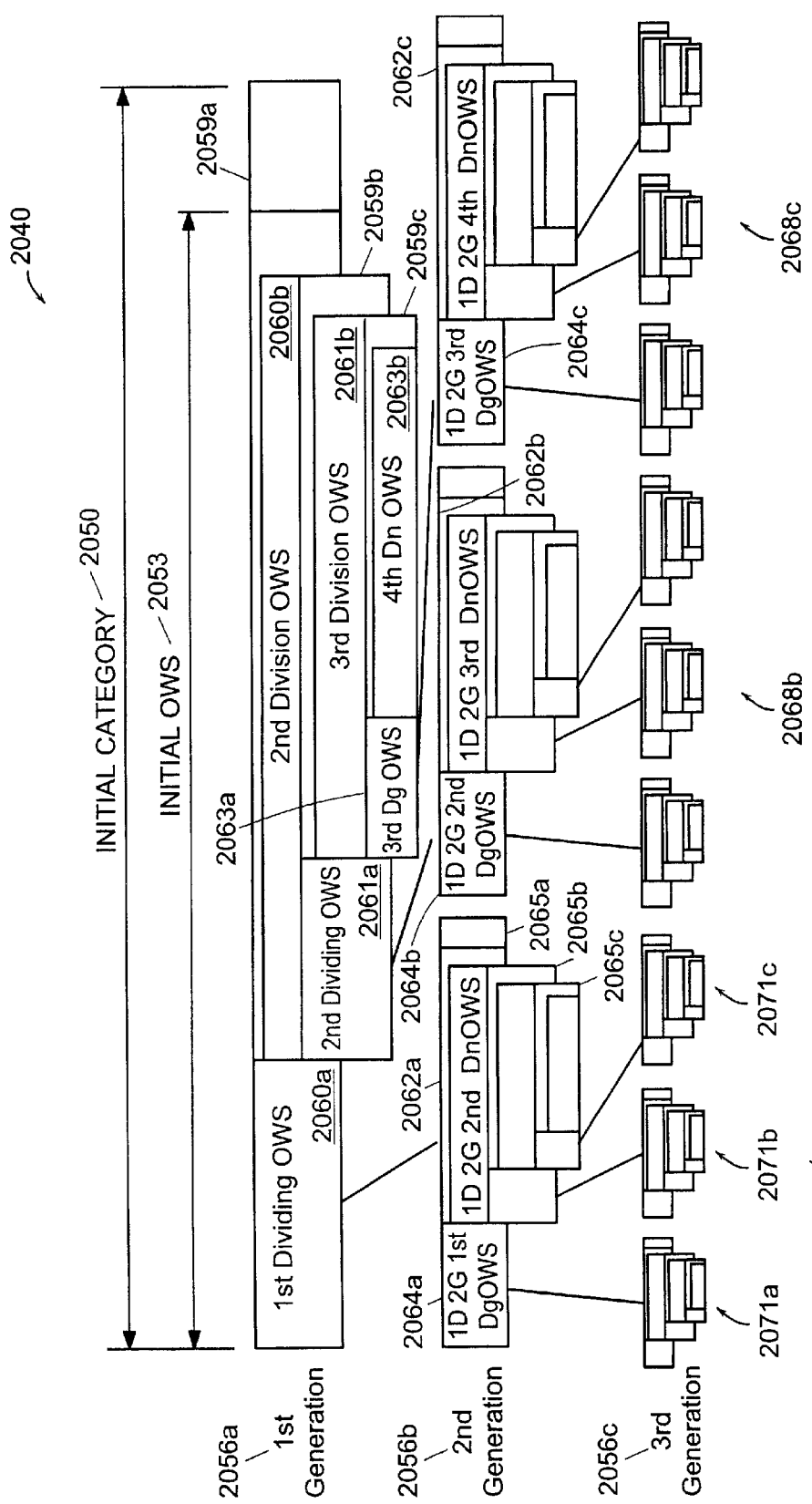
FIG. 7 is a schematic diagram of a recursive one word summary result structure for providing a user with information of alarm states in the alarm system of FIG. 1.

FIG. 7 graphically illustrates the recursive one word summary process 2040 of the present invention, which expands the one word summary process of the earlier processing routine version used to calculate the one word summaries of FIG. 6. Initially, a category 2050, whose recursive one word summary is to be computed, is given. The recursive one word summary process 2040 then follows the steps below:

Step 1. A one word summary (OWS) category 2053 (and its name) for the initial category 2050 is completed. Note that the OWS category 2053 might initially be the whole plant, e.g, the styrene plant 1232 (FIG. 3). If the initial OWS category 2053 is unchanged from the initial category 2050, it need not be distinguished. If no named OWS category 2053 results, the recursive branch stops here. Otherwise, the resulting OWS category 2053 (or original initial category 2050), is treated as the selected OWS category 2060a in the following step (Step 2).

Step 2. Another category, and its name, whose intersection with the selected OWS category 2060a contains the largest number of active alarms normalized by its total number of alarms, is determined. The OWS category 2060a is a one word summary for its own active alarms. For emphasis, this category 2060a is referred to as a "dividing" OWS category 2060a. The recursive branch stops if there is no such different category with any active alarms.

Step 3. Otherwise, Step 1–Step 3 are repeated in $2^{nd}$, $3^{rd}$ etc. divisions 2060b, 2061b, 2063b, respectively. For the initial OWS category 2053 in Step 1 in this recursion, a category consisting of the set of all alarms (active or not) which are in the previous division Step 2 selected OWS category 2060b, but not in the previous division Step 2 generated dividing category 2060a, is used.

Step 4. For every resulting, dividing, OWS category 2060a, 2064a, 2064b, 2064c, Steps 1–4 are repeated in $2^{nd}$, $3^{rd}$, etc., generations 2056b, 2056c. The dividing category 2060a is used as a new Step 2 selected OWS category. (Note that this step actually starts in Step 2 with a Step 2 category because the Step 1 generation of a one word summary is redundant.)

FIG. 8 illustrates a result of a recursive one word summary operation, as described by the process 2040 of FIG. 7. Normally, recursive one word summaries tend to be simple, but, however complex, the indented format shown provides an indication of every distinct OWS situation, however deeply nested. From the original category 2050, a OWS 2053 is determined. The OWS 2053 is parsed into a $1^{st}$ dividing category 2060a and a $2^{nd}$ division OWS 2060b based on non-included alarms and included alarms, respectively. Each dividing and division OWS category 2060a, 2060b is further subdivided into dividing and division OWS categories—here, respective $1^{st}$ Dividing and $2^{nd}$ Division OWS categories 2064a, 2062a. The recursive process continues until no named OWS category results for each future division.

The recursive OWS extends the previous system alarm monitoring tools' one word summary capability to generate appropriately concise automatic descriptions in which more than one set of independent, naturally grouped alarms active. Alternate embodiments of display formats are used in the summary display of FIG. 6 to indicate results of the recursive one word summary for each category in summary areas 2003 (FIG. 6).

Figure 9:
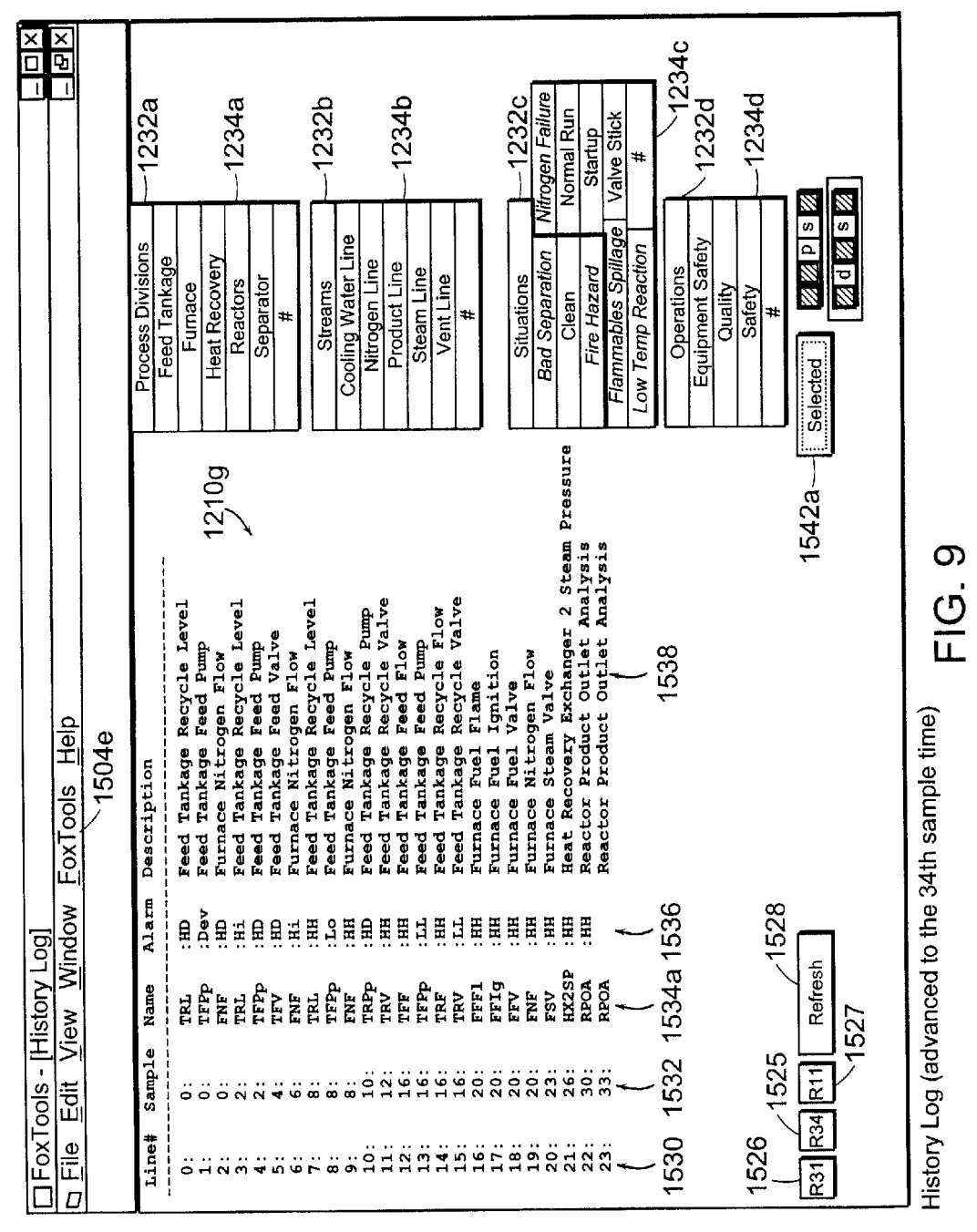

FIG. 9 is a history log display window displaying a list of alarm indications captured by the alarm monitoring system 50 of FIG. 1. The history log display window is instantiated by selecting a history log soft-button 1231a from within the access map window main display area 1500 (FIG. 3), or from using menu item 1504e navigation means (see FIG. 24 in application Ser. No. 09/303,519).

A history log main display area displays alarm indications of captured alarms. Preferably, the alarm indications are organized in a history log alarm sequence list 1210g. The alarm sequence list 1210g includes multiple fields for each indicated alarm, namely: a line number 1530, sample time 1532, main descriptor 1534*a*, alarm status 1536, and full text alarm description 1538.

In the preferred embodiment, captured alarm data is stored in a historical database which supports the history log alarm sequence list and display of the same. In one embodiment (see FIG. 2), the category subsystem 1122 interacts with the historical database (logs, lists, alarm trends) 1126, processes the stored data, and sends the processed alarm data through dynamic filter 1127*a* to the alarm display routines/function 1134 for display. Alternatively, the retrieved/processed/filtered historical data can be transferred to another historical database, computer, processing routine, or printer for other processing or analysis purposes.

In the history log alarm sequence list 1210*g* illustrated in FIG. 9, the first 33 captured samples are listed. The sample advancing button 1525 is selected to increase the sample count 1532 to list further sampled alarms stored in a historical database. The next sample to be shown is sample 34, as indicated by "R34" shown in the sample advancing button icon 1525. Button icons 1526, 1527, and 1528 are used to operate the demonstration for various practical reasons. A human-machine "selected" button 1542*a* is described below in reference to FIG. 16.

Figure 10:
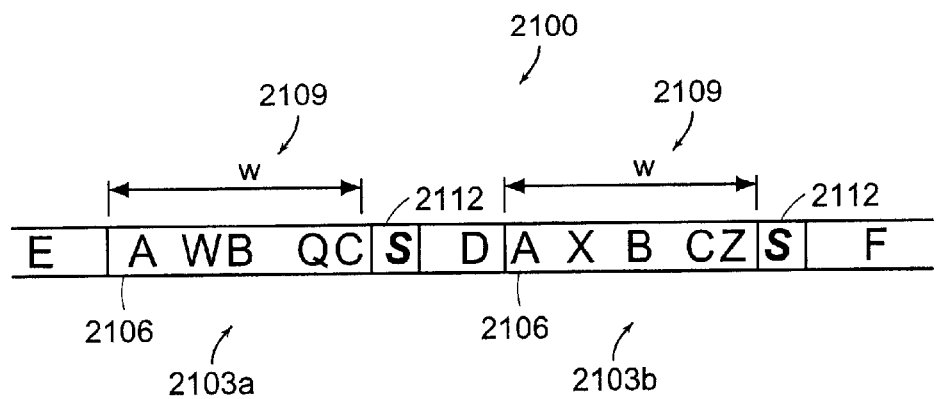
FIG. 10 is an illustration of alarm variable patterns located in windows of alarms associated with significant alarm events and stored in the history log of FIG. 9, where the alarm variables are represented by alphanumeric characters.

FIG. 10 represents an alarm sequence captured by the alarm monitoring system (FIG. 2), such as one indicated by the alarm sequence list 1210*g* (FIG. 9). It is this alarm sequence list 1210*g* that the off-line pattern analysis aspect of the present invention uses as alarm data. Off-line pattern analysis is a form of discrete auto-correlation (i.e., distinguishes alarm "patterns" from alarm "noise") operating on an accumulated history of alarm data. To that end, the off-line pattern analysis is used to generate new patterns that are used during on-line operations to detect alarm patterns. In turn, this provides an operator with an expanded diagnostic tool.

The notion of analog time is replaced by sequencing of the alarms, with analog time only used to define a window 2109 of analysis. The user selects a significant alarm event, for example "S" 2112 (or significant pattern kernel of several events) for which the system finds all possible associated patterns within the database having alarm sequence list 1210*g* data (FIG. 9). The problem, similar to the problem of on-line pattern analysis, is to distinguish valid patterns from all other alarms and patterns occurring at the same time. The separation is needed both (a) in processing the data to remove irrelevant alarms and patterns, and (b) in display, to let the user see multiple distinct patterns embedded in the data.

Continuing to refer to FIG. 10, the individual alarm events in the historical alarm sequence 2100 are analyzed for frequency of occurrence to recognize events that are so commonplace as to constitute noise to any pattern analysis. Similarly, alarms occurring in established patterns are preferably eliminated before the analysis. Noise effects due to overlapping unknown patterns must be accommodated by "auto-correlation" of multiple instances of the significant alarm event 2112. A pattern is recognized if it occurs often enough in association with the distinct significant alarm event 2112 occurrences to be an assured pattern and not a random effect of combined occurrences of other individual patterns or alarms that have not been eliminated but are themselves associated with unmeasurable statistics.

The following outline procedure provides a method for accomplishing the off-line pattern analysis. (The whole process may be repeated for several significant alarm events or pattern kernels to generate the counterpart of a full auto-correlation)

Step 0
Select:
  a. a significant alarm event (or pattern kernel), "S" 2112. In the analysis, the history database is searched for each occurrence of such an event or kernel and the related windowed alarms.
  b. a time window, W, 2109, which determines what interval before (or after, if this mode is selected) each recognized significant event or kernel 2112 is searched for accumulated, associated alarms in alarm windows 2103*a*, 2103*b*. Typically, the time window, W, 2109, is chosen based on how long the events are to be correlated, which is likely to be heuristically determined. The size of the time window 2109 varies depending on the type of processing system being monitored (e.g., high speed bottling machinery vs. relatively slow styrene machinery).
  c. a chatter threshold, H, 2115 (FIG. 11), which determines how much time between separate occurrences of the same alarm state is required before the pulses are merged. Typically, the chatter threshold, H, 2115, is chosen heuristically and through experience with the process being monitored.
  d. a specified probability, p, which determines the estimated probability of random occurrence of an alarm type above which all such alarm events are purged from the detected windowed alarms 2103*a*, 2103*b*. Typically, the probability, p, is chosen heuristically and through experience with the process being monitored.
  e. a threshold count, C, below which a recognized pattern is merged as a so-called "too likely" random artifact. Typically, the threshold count, C, is chosen heuristically and through experience with the process being monitored.
  f. a set of mask/filter categories applied to the entire involved (subset of) alarm history prior to analysis.
  g. a set of recognized patterns applied to the entire involved alarm history prior to analysis, and a pattern threshold, T. Also, all pattern alarms occurring between the first and last pattern event 2112 occurrence; a pattern occurrence whose maximum metric exceeds T is purged from the analysis. Typically, the pattern threshold, T, is chosen heuristically and through experience with the process being monitored.

Figure 11:
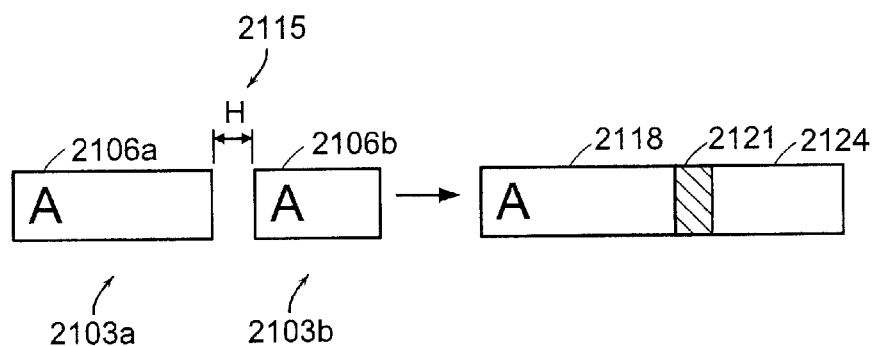
FIG. 11 is an alarm stream segment illustration used to illustrate gaps between frames of alarm windows of FIG. 10.

Step 1.
  a. Scan the individual historian alarm events;
  b. Eliminate any characteristic chatter, due to equipment noise in a particular spectrum (which varies from system to system), on the time scale of the window 2109 (by merging alarm state pulses, separated by less than H 2115); FIG. 11 illustrates the patterns 2103*a,b* separated by H 2115. The alarm sequences 2103 are kept as sequences 2118, 2124 with alarms outside those sequences 2118, 2124 being deleted (e.g., sequence 2124) from analysis.
  c. Referring again to FIG. 10, determine the frequency and accumulated duration of each type of event;
  d. Identify and count the distinct (de-chattered) significant events or kernels 2112;
  e. Purge any event type whose estimated probability of randomly occurring in each of that many windows 2109 exceeds p.

Step 2.

Accumulate all the alarm event types not filtered or purged from the analysis which occur within W 2109 before (or after) any significant event/kernel 2112 occurrence.

Step 3.

Figure 12:
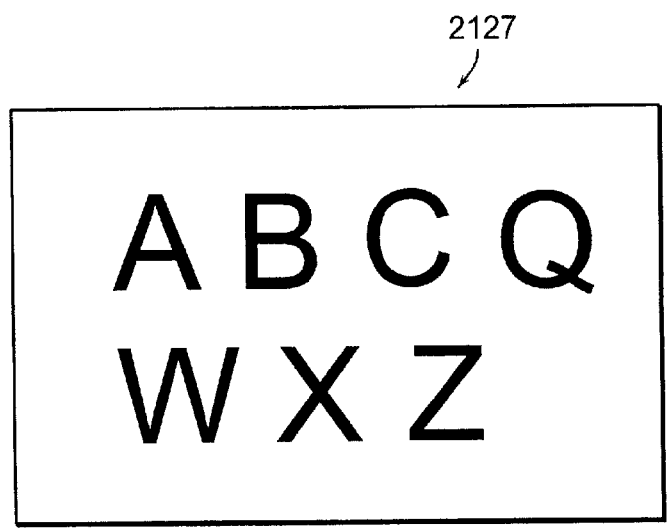
FIG. 12 is an alarm stream segment illustration depicting all the alarms captured inside the frames of FIG. 10.

Display the accumulated alarm event types from step 2 to the user/operator. FIG. 12 represents the accumulated event types 2127. The user may then discard some, as being clearly irrelevant, or add others, which may have been lost due to a mask. Each of the remaining event types is assigned a distinct code defining a range between 1 and 255, in alphabetical order of the alarm event tag (which includes both a variable tag and type tag). Examples of such character codes include: A100, A123, B206, and D123. There may be eight, ten, or more cases with each event, so it is desirable to tokenize all A100 events into '1', all A123 events into '2', all B206 events into '3', etc. This number of codes is adequate because no pattern is expected to include close to 255 events.

Step 4.

Figure 13:
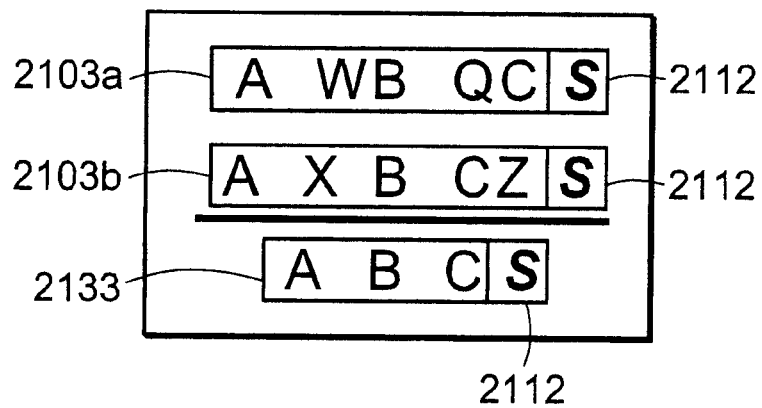
FIG. 13 is an alarm stream segment illustration of an intermediate step in the discrete auto-correlation process depicting two frames of alarms from FIG. 10 and a frame of shared alarms determined by the discrete auto-correlation pattern analysis.

The events included in sequence in each alarm window 2103a, 2103b, (FIG. 10) together with the following (or preceding) significant event/kernel 2112, constitute potential patterns. FIG. 13 includes such potential patterns in alarm windows 2103a, 2103b with significant events/kernels 2112. If there are no such events 2112, that alarm window 2103a, 2103b should be ignored (or W 2109 is too small). In addition to the initial pattern, and all its subsets, associated with each significant event or kernel 2112 occurrence and window 2103a,b, the following additional associated potential patterns are defined:

a. Compute every largest distinct set intersection between the windows 2103.
  b. Construct a pattern from that intersection that preserves all shared alarms, preserving the order of those when the order is common to each of the original patterns, and grouping the remaining alarms as order independent.

Each such pattern 2133 is considered to be associated with every window 2103a, 2103b that contributed to the intersection of the pattern 2133. Any duplicates generated by this process must be associated with different windows.

Step 5.

a. Represent each potential pattern 2133 as a coded character string (terminated by a 0 code) in a string pool set aside for this purpose;
  b. Eliminate all but the last occurrence of each distinct code in each string;
  c. Order a directory of these strings (and the strings themselves if desired) in lexicographic (alphabetical) order.

Step 6.

a. Identify all largest strings whose included codes are not included within some other string.
  b. Where several distinct strings share the same overlapping codes, include each.

Step 7.

a. Treating each such string as a candidate pattern, count the number of other strings whose pattern metric with respect to the pattern string exceeds T (and is thus considered significantly matched to it).
  b. Exclude from this count any strings that were generated as set intersections from the same windows 2103a, 2103b as the candidate pattern.
  c. Eliminate any pattern if its count is less than C (is not considered significant).
  d. Set aside any string whose metric, with respect to some saved candidate pattern, does not exceed T.

Step 8.

a. Repeat Step 5 on the strings set aside in Step 7;
  b. Add the resulting candidate patterns to the original set;
  c. Repeat Step 6.

Step 9.

Repeat step 7 until no further candidate patterns are eliminated. At this point, there should be no set-aside strings.

Figure 14:
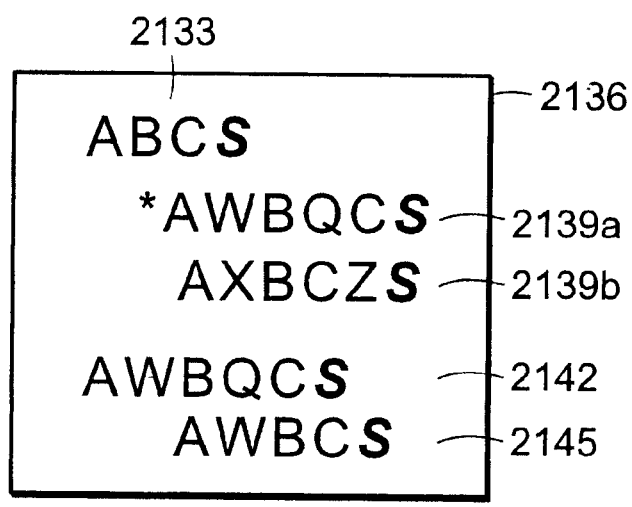
FIG. 14 is an alarm stream segment illustration depicting a final set of data, resulting from the discrete auto-correlation pattern analysis of the present invention, used to recognize alarm patterns in the alarm monitoring system of FIG. 1.

Step 10.

a. Gather all of the candidate patterns of the last execution of Step 6;
  b. Referring again to FIG. 14, in a new directory 2136 (or by using the original one), order these candidate patterns lexicographically;
  c. Mark the candidates 2133, 2142 so they can be distinguished;
  d. Within the new directory 2136, list each (other) string, in a group, after any candidate pattern 2133, 2142 for which its metric exceeds T. Any string (including a candidate) may be included in the group of several candidates;
  e. Mark any candidate 2139a, 2139b, 2145 included in such a group and mark any group string that occurs in several groups by its number of duplications; the single asterisk to the left of string 2139a indicates that the string 2139a occurs in one other group (i.e., string 2142 found in the second group).
  f. Order all group members 2139a, 2139b, 2145 lexicographically within their respective groups;
  g. Generate and present to the user a display of all of the strings, appropriately translating the codes in each string back to the original tags representing the different marks and setting of the groups.

Step 11.

The operator chooses any patterns 2133, 2139a, 2139b, 2142, 2145 that the operator desires to preserve for on-line use, deciding which events are causes, results or side effects.

Figure 15:
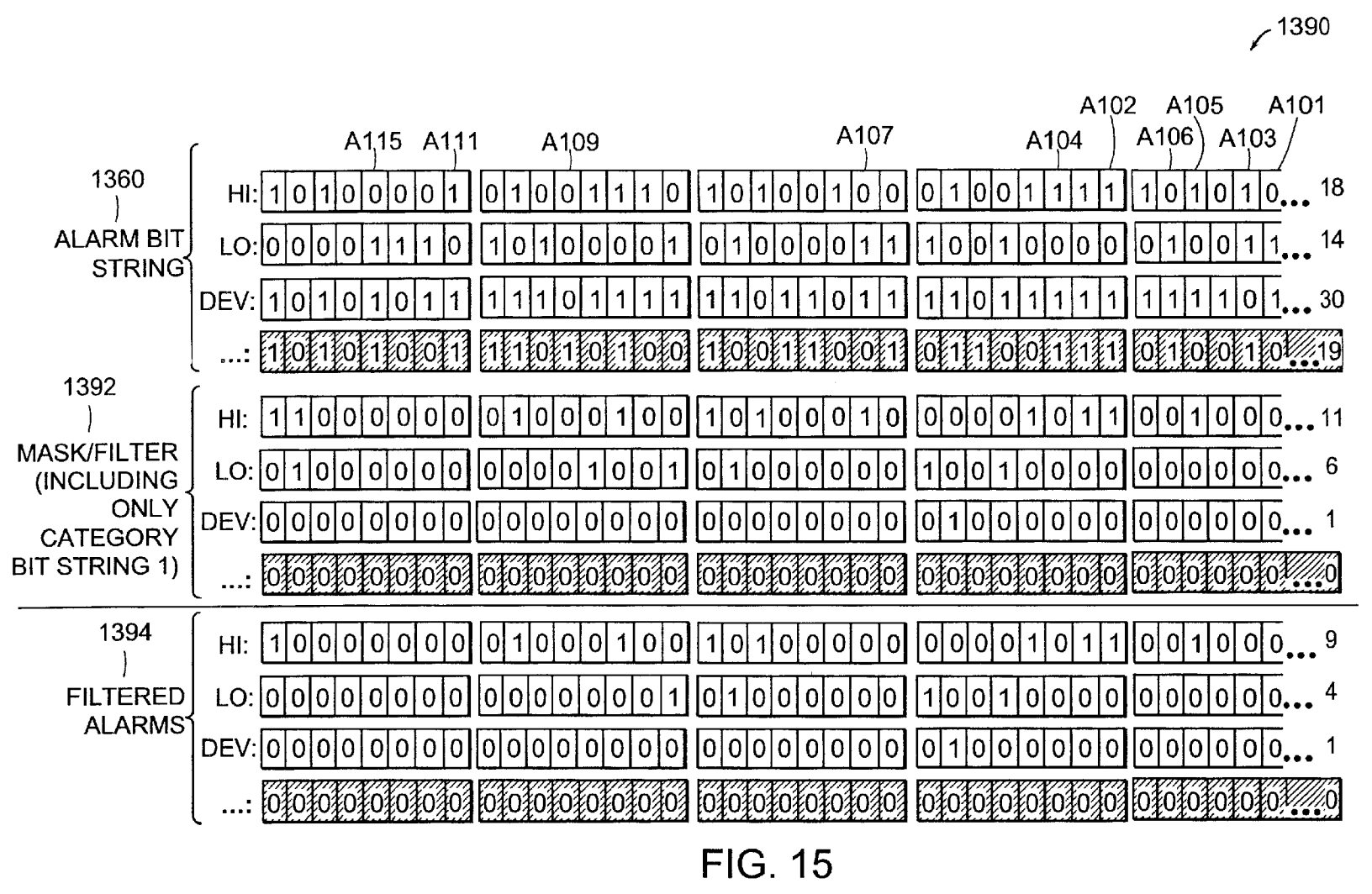

FIG. 15 is an example of a mask/filter function. Like the one word summary computations, the category priority computations are normally carried out after the mask/filter is applied. However, one word summary computations are applied after the alarms have been subjected to a mask/filter 1392. This requires a separate pair of bit strings: one for the mask/filter 1392 as calculated itself, and one for the filtered alarms 1394, which are then used in computations restricted to them. An alarm bit string 1360 is provided and used in an AND-ing operation with the mask/filter 1392 to produce a filtered alarms bit string 1394.

The mask/filter 1392 itself is computed by considering all category bit strings that have been effectively selected for the mask/filter 1392. All those that are in each independent categorization are OR-ed together. The OR-ed results for each such categorization are then AND-ed together. The mask/filter 1392 results, containing bits for all alarms that are included in at least one of the selected subcategories of every one of the independent categorizations.

This operation, in one embodiment, is incremental in the sense that the net mask/filter string 1392 is changed by combining with any new independent categorization that results from deselection of a previously selected category. The resulting categorization is more restricted and therefore applicable to narrow the bit selection of the mask/filter 1392 as a whole. The same cannot be said of a new selected category, which requires a computation from scratch (there are, however, other opportunities for incremental mask/filter computation based on independent storage of intermediate independent categorization results.)

Understanding the relationship between the mask/filter 1392 and the categories provided for the operator is important to understanding another aspect of the present invention, referred to as functional mask/filtering. Referring again to FIG. 6, the screen view 2000 includes categories divided into process divisions, streams, and situations. A corresponding mask/filter 1392 (FIG. 15) has state information for masking/filtering the alarms included in each of the categories and patterns shown in the screen view 2000. The screen view 2000 also shows the inclusion of masking based on functional categories: acknowledgment or unacknowledgment 2009*a*, recent or old 2009*b*, and in or out of service 2009*c*, effectively expanded as follows.

In the preferred embodiment, each of the buttons 2009*a*, 2009*b*, 2009*c*, (collectively 2009) describes a mask condition applicable to all alarms. Each displayed alarm must meet the conditions of each of the buttons 2009, as well as the combined effect of each of the other rows of categorizations (e.g., streams, situations, etc.). This contrasts with the other rows where each row masks out only those alarms that are not included in any of the selected categories. Further, each of the three buttons 2009 corresponds to three states: including all alarms, including only the alarms meeting the first listed condition (e.g., un-acknowledged), or including only the alarms meeting the second listed condition (e.g., acknowledged).

The foregoing functional mask/filter aspect is implemented by including a separate bit string in the mask/filter 1392 (represented in FIG. 15) for each of these buttons 2009. Individual bits in the mask/filter 1392 each correspond to a similar alarm bit in the alarm bit string 1360 (FIG. 15) and represent the button 2009 (e.g., acknowledgment) related to that alarm. The additional bit strings associated with the functional mask/filter aspect are processed (either in direct or inverted form) as part of the mask/filtering, similar to the category generated mask string 1392, as part of determining the final mask display state shown in the screen view 2000.

Still referring to FIG. 6, a second feature related to interfacing with the mask/filter 1392 (FIG. 15) is also shown in the screen view 2000. To the right of the select button 225, near the lower left-hand corner of the screen view 2000, is a soft selector button labeled "M"(mask) 226. This button 226 supports two states: "M"(mask) and "R"(reversed). This button 226 is designed to remind the operator of those alarms that are masked out. When the button 226 is in the reversed state (R), then precisely those alarms are shown, and it is those alarms that are then used in mask/filter calculations. The purpose is to provide the operator with a quick means for looking at those things he has chosen not to see to determine if he is missing anything. Again, only active alarms are considered.

Another aspect of the present invention is related to viewing various hierarchical category levels while controlling the mask/filter operator interface (soft buttons) of FIG. 6, corresponding to the mask filter 1392 bit string of FIG. 15, and interpreting alarm information in light of the mask/filter 1392. The alarm monitoring system 1120 (FIG. 2) envisions an open-ended hierarchical set of user defined nested categories 1135 (FIG. 2). While the tendency of users is to imagine that the number of categories is limited, in fact, the alarm monitoring system 1120 concepts are most powerful to the extent that the number of categories is proportioned on the number of process points in the alarm system of FIG. 1. The more categories, the greater the descriptive power of the one word summaries (e.g., 1251*a*, 1253*a* FIG. 4) and other functions. One of the uses of these open-ended defined categories is a displayable, operator-controlled mask/filter 1392, but, a displayable, operator-controlled mask/filter 1392 presents a special display problem when applied with large numbers of (nested) categories. Rather than having a scroll bar on the mask buttons (e.g., 1232*a*, 2008 FIG. 6) and some kind of expanded page for looking at nesting of the categories, it is more advantageous to provide the user with clean mask/filter visibility (i.e., concise, manageable, easily interpreted information).

Figure 16:
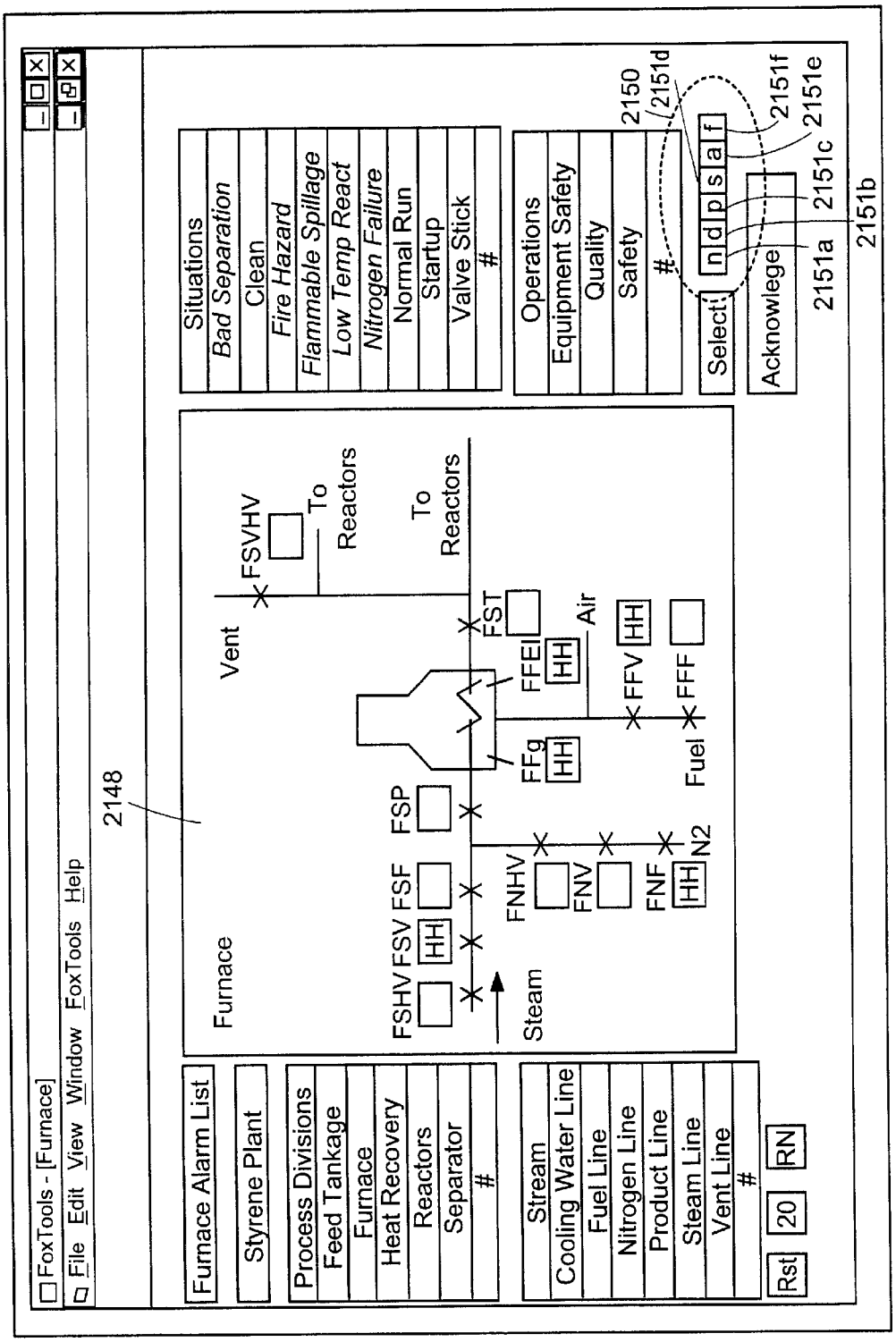
FIG. 16 is a screen view including toggle buttons 2150 enabling a user to change settings of a mask/filter displayed in and used by the alarm monitoring system of FIG. 1.

FIG. 16 is a screen view that provides an operator with a means for interfacing with, controlling, and displaying the underlying mask/filter 1392 (FIG. 15). Individual alarms are represented inside of a furnace category graphic in an alarm display area 2148. The furnace category is a subcategory of the process divisions categorization 1232*a* (FIG. 5), and graphically illustrated in the display area 1210*b* (FIG. 4). Further, the furnace category may also include subcategories in addition to the alarms represented in display area 2148.

The present invention makes it possible to select masking categories at every level of the hierarchy. Still referring to FIG. 16, the mask/filter 1392 (FIG. 15, illustrated to the operator in FIG. 16 by various optical embellishments to the category selector buttons) shows the operator what he has selected in a single display, and indicates the existence of lower-level subcategory masking of categories that he has selected in the mask. Further, the present invention allows an operator to select any set of alarms for "zoomed-in" display from the current display area 2148, window 1210*b* (FIG. 4), or other screen view 1500 (FIG. 3).

The following elements are incorporated into the hierarchically-structured category tools provided by the present invention in each of the screen views:

a. There is a mask/filter operator display for every category, accessible hierarchically from some central starting point. Each such display shows alarm information for a set of process points/variables, from the point of view of that category. The associated mask/filter display includes selection buttons 2150 for a complete set of subcategories of that category, treating that category as a categorization;

b. The associated mask/filter display also includes selection buttons 2150 for the subcategories of each (other) categorization, other than the one of which the display category is a subcategory. The result is that every category may be selected or deselected for masking purposes, at least from the category display of which it is a direct subcategory.

In any such selected display, the mask reflects the next level down of nested categories for the categorization hierarchy used to select the display and the top level categories for all other categorizations. This keeps the number of mask/filter buttons manageable while allowing nested selections to affect higher-level selections. However, lower-level mask/filter selections, not within the categorization of the currently displayed category, are difficult to access in the prior system. Therefore, the present invention expands the selection modes from five kinds of selection modes, including no display (n) 2151*a*, deselect (d) 2151*b*, pattern deselect (p) 2151*c*, select (s) 2151*d*, and full display (f) 2151*f*, into a split "select" structure, adding the all-select selection form, with a resulting six kinds of selections.

Figure 17:
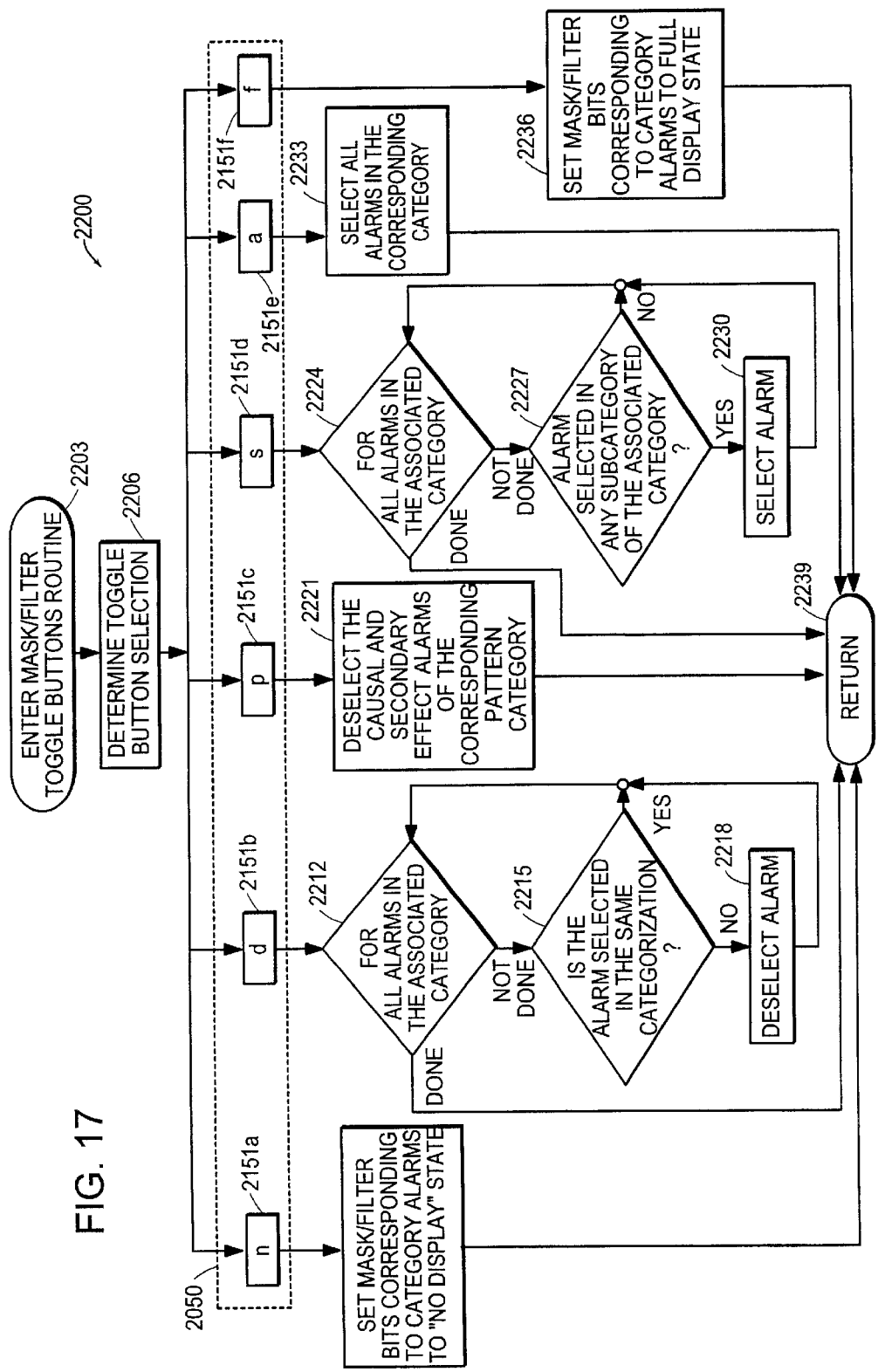
FIG. 17 is a flow diagram of an embodiment of a mask/filter toggle buttons routine for executing the effects of the toggle buttons 2150 of FIG. 16.

A description of each function corresponding to each descriptive selection mode letter toggle button 2150 is provided in turn in reference to FIG. 17. FIG. 17 provides a flow diagram 2200 of underlying processes for the toggle buttons 2050. Although represented by loops and linear flow, the processes depicted may be implemented through various programming language constructs and data structures, including object oriented languages.

Upon detection of an operator's selection of a toggle button 2050 (FIG. 16), the process underlying the user display (i.e., screen view) calls the mask/filter toggle buttons routine 2200. Entry into the toggle buttons routine 2200 occurs in step 2203, where parameter transaction occurs. In step 2206, a determination is made as to which toggle button 2050 has been selected. In the following list, the parenthetical letters n, d, p, s, a, and f correspond to the toggle button 2050 labels.

1. The No Display (n) toggle button 2151a acts (as before) to suppress all display of its corresponding category alarms, without regard to the selections of subcategories of that category. This act is accomplished in step 2209 by setting mask/filter 1392 (FIG. 15) bits, corresponding to alarms associated with an operand (i.e., operator chosen) category, to "zero" (i.e., no display). The No Display toggle button 2151 process ends in step 2239, which returns control to a processing routine operating the screen view of FIG. 16.

2. The Deselect (d) toggle button 2151b acts (as before) to deselect all alarms in the associated category, not otherwise selected within the same categorization. It also allows display of any subcategories selected anywhere for full display.

Deselection is accomplished by a "for" loop following the Deselect toggle button 2151b. In step 2212, the "for" loop defines repeating loop steps 2215, 2218 for all alarms in the associated category. For each respective alarm, a determination is made on step 2215 as to whether the alarm is selected in the same categorization as the associated category. If the alarm is not selected in the same categorization, then deselection of the alarm being processed is deselected in step 2218. If the alarm is otherwise selected in the same categorization (by another category or in the categorization directly), then the loop returns to the "for" statement in step 2212 for continued processing. When step 2212 has determined all alarms in the category have been processed by steps 2215, 2218, the process passes to the return step 2239.

3. The Pattern deselect (p) toggle button 2151c acts (as before) to deselect the causal and secondary effect alarms of the corresponding pattern (as in deselect mode). This act is accomplished in step 2221 by deselecting mask/filter 1392 bits corresponding to the casual and secondary effect alarms of the corresponding pattern category (cause, result, effect alarms discussed in reference to FIG. 18). The pattern deselect toggle button 2151c process ends in step 2239.

4. The Select (s) toggle button 2151d now acts (in the present invention) to select all alarms from an operand corresponding category, except those alarms that are not selected in any of its subcategories (any alarm not so selected may still be selected in some other subcategory of the same categorization).

Selection is accomplished by a "for" loop following the select toggle button 2151d. In step 2224, the "for" loop defines repeating loop 2227, 2230 for all alarms in the associated (operand) category. For each respective alarm, a determination is made in step 2227 as to whether the alarm is selected in any subcategory of the associated category. If the alarm being processed is selected in any subcategory of the associated category, then the alarm is selected (i.e., corresponding mask/filter 1392 (FIG. 15) bit set to true "1") in step 2230. If the alarm is not selected in any subcategory of the associated category, then the next alarm is processed in typical "for" loop (or other type of processing loop, such as "while . . . do" loop) manner. When step 2224 has determined all alarms in the associated category have been processed by steps 2227, 2230, the process passes to the return step 2239.

5. The All select (a) toggle button 2151e acts (in the present invention) to select all alarms from an operand corresponding category, without regard to the selections of subcategories of that category. This selection occurs in step 2233, where the corresponding category is defined as a category selected by the operator prior to selecting the all select (a) toggle button 2151e on which the processor step 2233 is performed. The process continues by returning to the processor routine operating the window (of FIG. 15) in step 2239.

6. The Full display (f) toggle button 2151f acts (as before) to display all of its corresponding category, without regard to the selections of subcategories of that category. In step 2236, the processor routine 2200 sets mask/filter 1392 (FIG. 15) bits corresponding to category alarms to "one" (i.e., full display) so that those category alarms are displayed when received by the alarm monitoring system. The full display toggle button 2151f process finishes in step 2239.

As in the previous system, an alarm is displayed if it is in a full display category, or if it is selected, as above, in every categorization. But, it does not display any alarm that is in a category selected as a "no display". As in the previous system, selection acts in an OR manner within the nested subcategories of any categorization and in an AND manner between categorizations. The button states determine which alarms are displayed in the corresponding categories.

Another aspect of the present invention applies to display functionality. Referring again to FIG. 6, the summary areas 2003 include so-called "quick-reaction" buttons 2006. The quick-reaction buttons are coupled to the one word summary indicators located to the left of the quick reaction buttons 2006.

The function of the quick-reaction buttons 2006 is to allow the operator to go to a supporting display associated with the indicated one word or priority summary category. The interesting, novel dimension is that the choices of these categories are not preconfigured (for example, in a so-called "drop-down" menu selection list) but dynamically computed by the system. Thus, the operator button selection is computed dynamically by the system to track the overall alarm situation.

Figure 18:
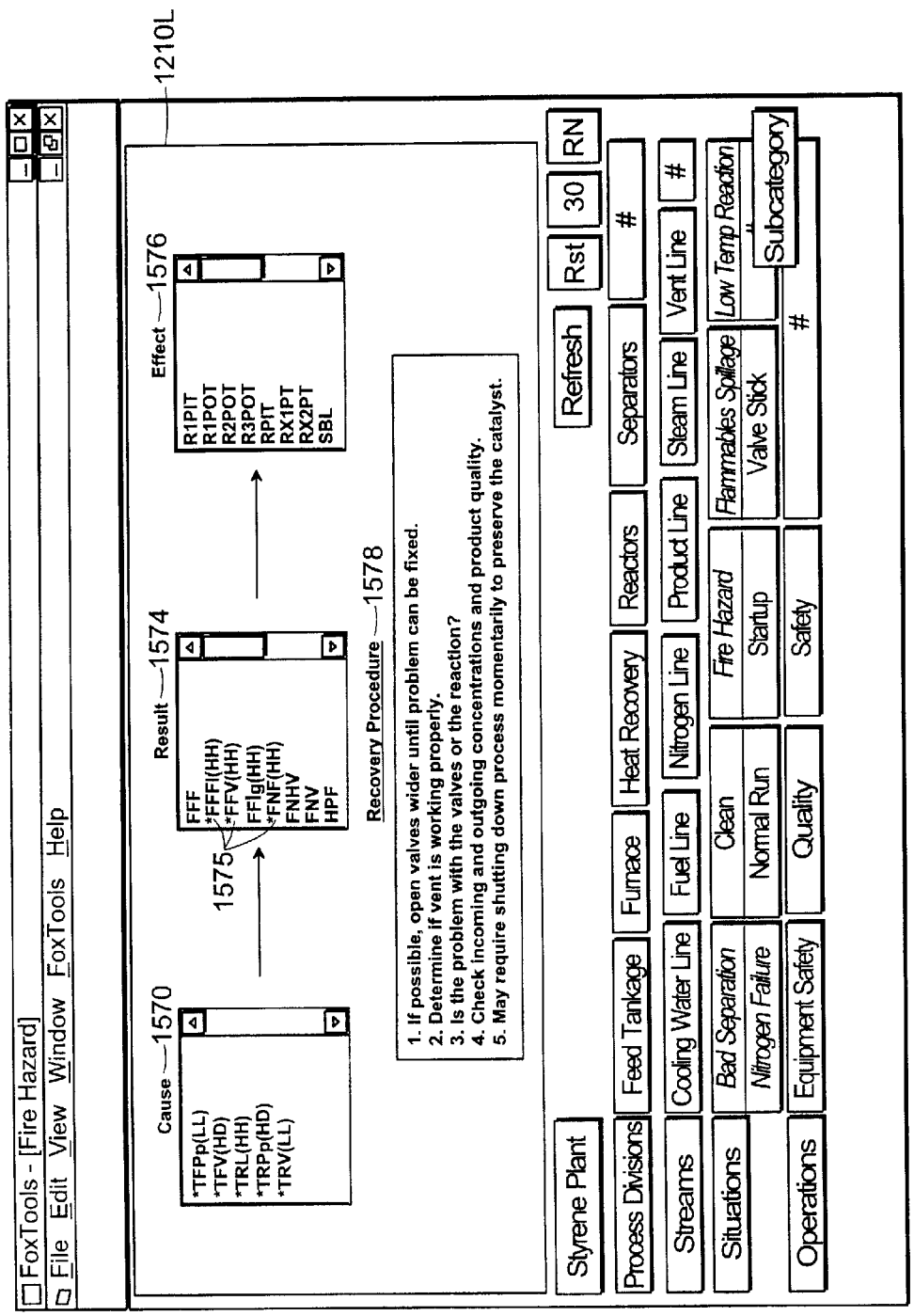
FIG. 18 is a screen view indicating cause, result and effect alarms defining an example pattern in the styrene plant example of FIG. 6, where the screen view is generated based on information associated with dynamically calculated one word summaries.

FIG. 18 includes a pattern display 1210L showing cause alarms 1570, result alarms 1574, and effect alarms 1576. Alarms detected in the depicted sequence indicate a fire hazard within the system being monitored. This pattern display 1210L is displayed to the operator after the operator selects a quick-reaction button 2006 (FIG. 6) coupled to the fire hazard one word summary.

Figure 19:
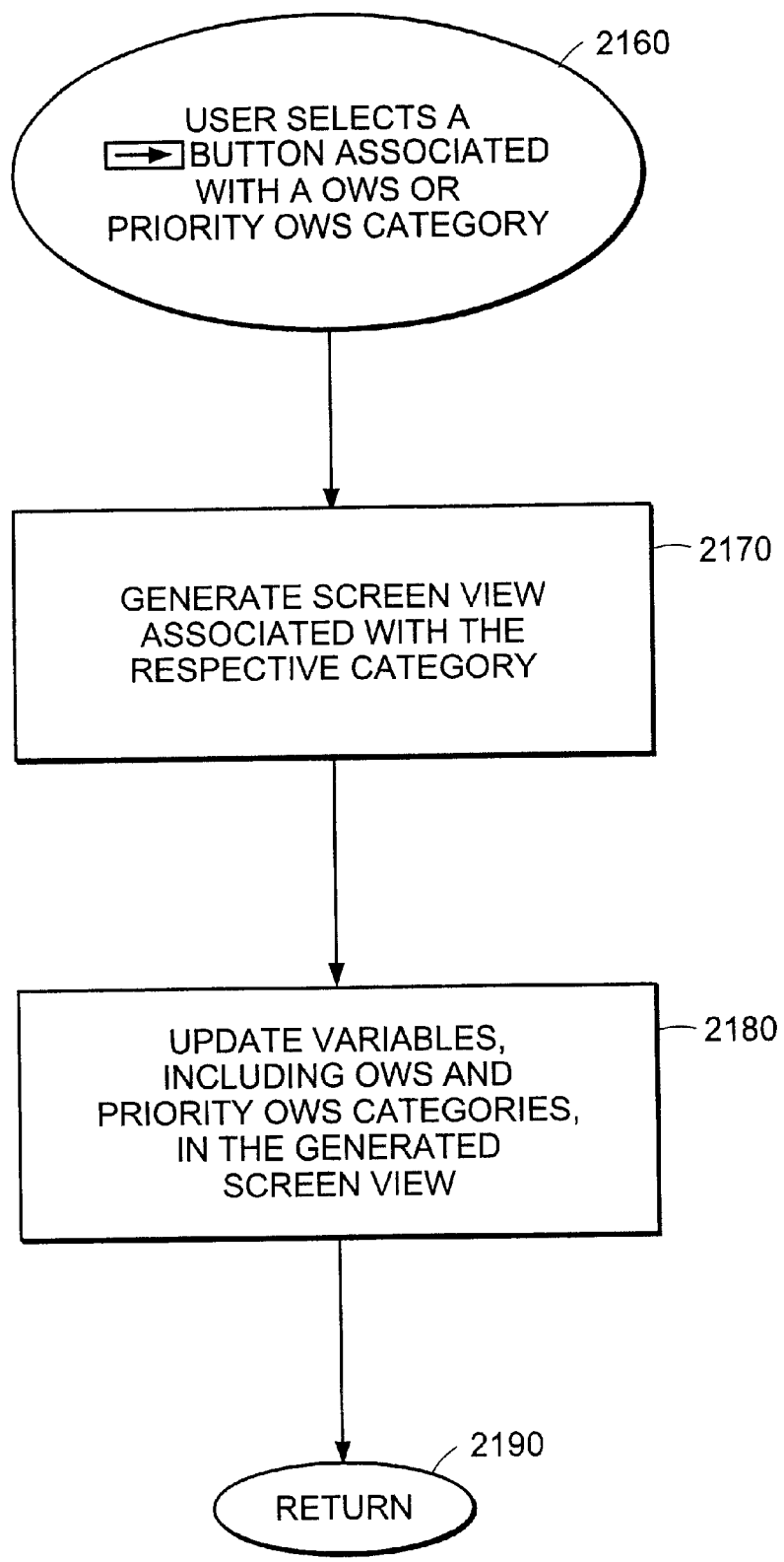
FIG. 19 is a flow diagram representing a process sequence used to produce the screen view of FIG. 18 associated with the dynamically determined one word summaries of FIG. 6.

FIG. 19 is a flow diagram of a process executed by the alarm monitoring system in response to a user's selection of a quick-reaction button 2006 (FIG. 6). The process begins when the user selects a right-arrow button 2006 associated with a OWS or priority OWS category. Though the right-arrow buttons 2006 are associated with respective OWS or priority OWS category text boxes (see FIG. 6), the calculated OWS and priority OWS categories displayed in the text boxes change as the alarm system variables change states. Thus, the screen views generated by the selection of the quick-reaction buttons 2006 are dependent on the dynamically changing alarm conditions.

In step 2170, the process generates a screen view associated with the calculated OWS in the respective right-arrow button associated text box. The screen view may be generated in accordance with the OWS category name or a respective OWS category index (not shown). Once the new screen view is generated, in step 2180, the process updates variables that are used to provide substantive information for the user. These variables optionally include OWS and priority OWS categories. For generated screen views of alarm patterns, other variables and patterns of alarms (e.g., 1570, 1574, 1576 in FIG. 18) are accessed and presented to the user. OWS categories are calculated on an as-needed basis (i.e., real-time) while patterns are determined from stored alarm events in the alarm log 1126 (FIG. 2). In step 2190, the process exits to allow the alarm monitoring system to continue processing alarm events and supporting user interaction.

It should be understood that the alarm monitoring system comprises instructions executable by a processor. The instructions are stored on a computer readable medium, such as RAM, ROM, CD-ROM, and magnetic or optical disks. The computer readable medium may be located locally or remotely and downloadable over a computer network. Portions of the executable instructions may be executed by one or more processors in a parallel or distributed manner.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for recursively generating a descriptor summary for related independent alarm events, comprising:

an alarm monitoring system comprising a processor coupled to an alarm system having knowledge of a status of a plurality of alarms, the alarm monitoring system categorizing alarms into categorizations, categories, and subcategories and providing alarm pattern information, the categories including alarms and subcategories; and a processor routine operating on the processor, the processor routine recursively determining recursive descriptor summaries for each descriptor summary category and subcategory based on alarm status, the recursive descriptor summaries being for related, independent alarm events.

2. The apparatus according to claim 1, wherein the processor routine determines descriptor summaries in a real-time manner.

3. The apparatus according to claim 1 further including a screen view displaying the determined descriptor summaries.

4. The apparatus according to claim 1, wherein the recursive descriptor summary categories comprise:

a dividing descriptor summary category;

a division descriptor summary category; and wherein the processor routine repeatedly determines dividing and division descriptor summaries, each dividing and division descriptor summary category being a parent of a next descriptor summary category generation.

5. In a computer, an apparatus for detecting alarm patterns in a stream of alarm events in an alarm system having (i) an alarm variable event stream transferring alarm status information from alarm generators to an alarm system and (ii) a digital processor, the apparatus comprising:

a historical database of alarm events having a subset of significant alarm events; and a processor routine operating on the processor, the processor routine:

determining patterns of alarm events in time windows in the historical database following the significant alarm events, the processing routine auto-correlating multiple instances of the significant alarm events to restrict noise effects due to overlapping unknown patterns; and applying the patterns of alarms to the stream of alarm events to detect the determined patterns in the stream of alarm events.

6. The apparatus according to claim 5, wherein the processor routine preprocesses the historical database to remove established alarm events.

7. The apparatus according to claim 5, wherein the processor routine represents each potential pattern as a coded character string for further processing.

8. The apparatus according to claim 5, wherein the processor routine provides a subset of determined patterns to a detector routine monitoring the alarm patterns in the stream of alarm events.

9. In a computer, a method for affecting reported information provided by an alarm monitoring system having categories of alarms, including the steps of:

providing a screen view coupled to an alarm monitoring system displaying a plurality of alarm categories and subcategories as selectable indicators, each category and subcategory including related alarm variables having respective alarm status information and category alarm status information;

providing selectable functional mask/filter indicators representing possible functional states of the alarms; and masking/filtering alarm variables across a subset of the alarm categories as a function of the state of the selectable functional mask/filter indicators, thereby affecting the reported category alarm status information provided in the screen view.

10. The method according to claim 9, wherein the selectable functional mask/filter indicators include functional categories including at least one of: unacknowledged/acknowledged, recent/old, and in/out of service.

11. The method according to claim 10, wherein each selectable functional mask/filter indicator has states, including:

an all alarms state;

an only the alarms meeting the functional mask/filter indicator listed condition state; and an only the alarms not meeting the functional mask/filter indicator listed condition state.

12. The method according to claim 9, wherein the step of providing a screen view includes displaying alarm masking information as a function of a selectable alarm mask display indicator state, the alarm mask display indicator including a mask state and a reversed state, the screen view displaying alarm indicators when the alarm mask display indicator is in the mask state, the screen view displaying masked-out alarm indicators when the mask display indicator is in the reversed state.

13. An apparatus for affecting reported information provided by an alarm monitoring system having categories of alarms, comprising:

a screen view coupled to an alarm monitoring system displaying a plurality of alarm categories and subcategories as selectable indicators, each category and subcategory including related alarm variables having related alarm status information and category alarm status information;

a plurality of selectable functional mask/filter indicators coupled to a mask/filter, the selectable functional mask/filter indicators being displayed on and coupled to the screen view, each functional mask/filter indicator having states representing a functional status of an alarm; and wherein the state of the selectable functional mask/filter indicators determines the mask/filter state used to mask/filter alarm variables, thereby affecting reported information provided by the alarm monitoring system.

14. The apparatus according to claim 13, wherein the selectable functional mask/filter indicators include functional categories, including at least one of: unacknowledged/acknowledged, recent/old, or in/out of service.

15. The apparatus according to claim 13, wherein each selectable mask/filter has states, including:
   all alarms;
   only the alarms meeting the functional mask/filter indicator listed condition; and
   an only the alarms not meeting the functional mask/filter indicator listed condition state.

16. The apparatus according to claim 13, wherein the screen view displays the state of the alarm mask/filter, the alarm mask/filter responsively changing as a function of the state of the selectable alarm mask/filter indicators, the alarm mask display indicator including a mask state and a reversed state, the screen view displaying alarm indicators when the alarm mask display indicator is in the mask state, the screen view displaying masked-out alarm indicators when the mask display indicator is in the reversed state.

17. A method for controlling and displaying mask/filter selections for an alarm monitoring system having hierarchically defined categories of alarms, the method comprising the steps of:
   providing a screen view displaying a subset of categories expressed as category indications in a graphical user interface manner, each category being a member of a categorization and including subcategories and alarm variables representing corresponding alarm status information, the screen view including:
      a plurality of mask/filter selectors coupled to the category indications and a mask/filter, the mask/filter being coupled to the categorizations, the mask/filter selectors including an all-select selector and a so-called select selector, said all-select selector enabling selecting alarms in a specified category without regard to included respective subcategory alarm selections, said select selector enabling selecting alarms in a specified category except for alarms not selected in included respective subcategory alarm selections;
   changing the state of the mask/filter in response to selecting alarms at any hierarchical level; and
   modifying a subset of categorization, category, and alarm variable indications as a function of the mask/filter to provide mask/filter state information in the screen view, thereby displaying mask/filter selections.

18. The method according to claim 17, wherein the step of changing the state of the mask/filter includes the step of adjusting the state of the mask/filter from any screen view representing a hierarchical category level.

19. The method according to claim 17, wherein the step of modifying includes the step of applying at least one highlighting technique to the category indications for representing the state of the mask/filter, including: color, text style, shadowing, and additional symbols.

20. An apparatus for controlling and displaying mask/filter selections for an alarm monitoring system having hierarchically defined categories of alarms, comprising:
   a screen view displaying a subset of categories expressed as category indications in a graphical user interface manner, each category being a member of a categorization and including subcategories and alarm variables representing corresponding alarm status information; and
   a plurality of mask/filter selectors coupled to the category indications and a mask/filter, the mask/filter being coupled to the categorizations, the mask/filter selectors including an all-select selector and a so-called select selector, said all-select selector enabling selection of alarms in a specified category without regard to included respective subcategory alarm selections, said select selector enabling selection of alarms in a specified category except for alarms not selected in included respective subcategory alarm selections; and
   wherein (i) the state of the mask/filter changes in response to alarms being selected at any hierarchical level, and (ii) a subset of categorizations, categories, and alarm variable indications are modified as a function of the mask/filter to provide mask/filter state information, thereby displaying mask/filter selections.

21. The apparatus according to claim 20, wherein the state of the mask/filter changes responsively to adjusting the state of the mask/filter from any screen view representing a hierarchical category level.

22. The apparatus according to claim 20, wherein the category indications representing the state of the mask/filter are highlighted to indicate the state of the mask/filter, wherein the highlighting includes at least one of: color, text style, shadowing, and additional symbols.

* * * * *